United States Patent
Takagi

(10) Patent No.: US 8,093,547 B2
(45) Date of Patent: Jan. 10, 2012

(54) PROJECTOR AND LIGHT SOURCE APPARATUS HAVING A SECOND REFLECTOR FOR REFLECTING LIGHT IN INFRARED REGION

(75) Inventor: Kunihiko Takagi, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 373 days.

(21) Appl. No.: 12/544,502

(22) Filed: Aug. 20, 2009

(65) Prior Publication Data

US 2010/0045940 A1 Feb. 25, 2010

(30) Foreign Application Priority Data

Aug. 21, 2008 (JP) ................................ 2008-212516
Sep. 30, 2008 (JP) ................................ 2008-252672

(51) Int. Cl.
*H01J 5/02* (2006.01)
(52) U.S. Cl. ........................................ 250/239; 250/238
(58) Field of Classification Search .................. 250/239, 250/216, 238; 353/54–56, 85, 119; 362/257, 362/294–317
See application file for complete search history.

(56) References Cited

U.S. PATENT DOCUMENTS 7,063,423 B2 * 6/2006 Fujimori et al. ................ 353/55

FOREIGN PATENT DOCUMENTS

| JP | 2002-107825 | 4/2002 |
| JP | 2005-331743 | 12/2005 |
| JP | 2008-112094 | 5/2008 |

* cited by examiner

*Primary Examiner* — Que T Le
(74) *Attorney, Agent, or Firm* — Maschoff Gilmore & Israelsen

(57) ABSTRACT

A projector includes: a light source unit configured to emit light; a light source heat absorber configured to cause coolant to absorb heat from the light source unit; an ejector pump configured to allow passage of the coolant having absorbed the heat in the light source heat absorber; a radiator configured to radiate the heat of the coolant flowed out from the ejector pump; an evaporator configured to cool the coolant stored in the evaporator by evaporating the coolant; and a heat source other than the light source unit, wherein the ejector pump decompress the interior of the evaporator by a pressure drop due to the passage of the coolant having absorbed the heat in the light source heat absorber, and heat from the heat sources other than the light source unit is absorbed by the coolant cooled by the evaporator.

20 Claims, 16 Drawing Sheets

PROJECTOR AND LIGHT SOURCE APPARATUS HAVING A SECOND REFLECTOR FOR REFLECTING LIGHT IN INFRARED REGION

BACKGROUND

1. Technical Field

The present invention relates to a projector and, more specifically, to a technology of a projector having an ejector pump for cooling a heat source.

2. Related Art

The temperature of a light source apparatus used in a projector rises to a very high temperature such as 800° C. to 1000° C. The projector includes an optical element which modulates light emitted from the light source apparatus. The optical element also generates heat by being irradiated with the light from the light source apparatus and rises in temperature to a level higher than the ambient temperature (for example, to 60° C. to 90° C.). Therefore, an air-cooled cooling system which blows air to the light source apparatus or the like with a fan is employed in order to cool the light source apparatus or the optical element.

Since the temperature of the light source apparatus is very high, the temperature difference from an outside air is large. Therefore, a high cooling efficiency is expected only by blowing air at the ambient temperature to the light source apparatus. In contrast, since the temperature of the optical element is not as high as the light source apparatus, a high cooling efficiency can hardly be obtained even by blowing the air in the same manner as the light source apparatus.

Although the cooling efficiency of the optical element is increased by increasing the airflow quantity of the fan, there arises a problem such that the driving noise of the fan is increased in association with increase in airflow quantity. Accordingly, a technology to increase the cooling efficiency of the optical element by providing a cooling apparatus having a compressor without depending on the increase in airflow quantity of the fan is disclosed in, for example, JP-A-2008-112094.

Also, as a technology to absorb heat generated by the light source apparatus or light in an infrared region, a device having a coolant flow channel on a rear face of a reflector of the light source apparatus is proposed in, for example, JP-A-2005-331743. Also, a device directly arranged with liquid-phase coolant on the rear face of the reflector is proposed in, for example, JP-A-2002-107825.

However, when the compressor is provided in the projector, there arises a problem such that the projector is upsized due to an installation space of the compressor. Also, there also arises a problem such that an electric power for operating the compressor is separately required.

In addition, when the lifetime of the light source apparatus is ended, it is necessary to replace the light source apparatus. However, if the coolant flow channel is provided or the liquid-phase coolant is directly arranged on the rear face of the reflector of the light source apparatus, the coolant flow channel or the like might hinder the removal of the light source apparatus from the projector. In other words, there arises a problem such that the coolant flow channel or the like provided on the rear face of the reflector hinders easy replacement of the light source apparatus when replacing the light source apparatus.

SUMMARY

Various embodiments provide a projector which achieves improvement of quietness and downsizing of an apparatus, and also improvement of a cooling efficiency of a heat source such as an optical element while reducing power consumption. And various embodiments provide a projector which achieves efficient absorption of heat generated by a light source apparatus and easy replacement of the light source apparatus, and the light source apparatus thereof.

In one embodiment, there is provided a projector configured to display an image including: a light source unit configured to emit light for displaying the image; a light source heat absorber configured to cause coolant to absorb heat from the light source unit; an ejector pump configured to allow passage of the coolant having absorbed the heat in the light source heat absorber; a radiator configured to radiate the heat of the coolant flowed out from the ejector pump; an evaporator configured to cool the coolant stored in the evaporator by evaporating the coolant; and heat sources other than the light source unit, in which the ejector pump decompresses the interior of the evaporator by a pressure drop due to the passage of the coolant having absorbed the heat in the light source heat absorber, and heat from the heat sources other than the light source unit is absorbed by the coolant cooled by the evaporator.

Since the heat from the heat source other than the light source unit is caused to be absorbed by the coolant cooled by the evaporator, the airflow quantity of a cooling fan configured to cool the heat sources other than the light source unit may be reduced. Also, depending on the case, necessity of the cooling fan configured to cool the heat sources other than the heat source unit may be eliminated. Therefore, the improvement of quietness of the projector is achieved by reducing a driving noise of the cooling fan. The coolant in the interior of the evaporator is cooled by a loss of vaporization heat thereof at the time of evaporation.

Since the interior of the evaporator is decompressed by the ejector pump, the boiling temperature of the coolant in the interior of the evaporator may be lowered. Therefore, even though the temperature around the evaporator is almost the same as the ambient temperature, the temperature of the coolant in the interior of the evaporator may be lowered to a level lower than the ambient temperature. With the cooling using the temperature lower than the ambient temperature, the temperature of the heat sources other than the light source unit may be further lowered than air-cooling using air in a casing of about the ambient temperature in the related art.

Since the low temperature is generated by decompression in the interior of the evaporator by the ejector pump, the power consumption may be reduced in comparison with the case where a cooling apparatus provided with a compressor is used. The downsizing of the ejector pump, being easier than that of the compressor, contributes also to downsizing of the projector by itself.

Since the pressure in the interior of the evaporator is lowered by allowing passage of the coolant having absorbed the heat from the light source unit through the ejector pump, it is not necessary to provide the compressor for lowering the pressure in the interior of the evaporator, so that the downsizing of the apparatus and reduction of the power consumption are achieved.

Preferably, the coolant is evaporated in the light source heat absorber. By the evaporation of the coolant in the light source heat absorber, the coolant is transformed into a gas-phase coolant. The gas-phase coolant flows at a higher velocity than a liquid-phase coolant and hence passes through the ejector pump easily. Since the ejector pump is configured in such a manner that the higher the velocity of the fluid passing through the interior of the ejector pump, the larger the degree of pressure drop becomes, the easiness of the pressure drop in the interior of the evaporator is achieved by evaporating the coolant in the light source heat absorber. By lowering the pressure in the interior of the evaporator to a pressure at which the boiling temperature of the coolant becomes not higher than the ambient temperature, cooling of the coolant in the interior of the evaporator to a temperature not higher than the ambient temperature is also achieved.

Preferably, the heat source is an optical element configured to modulate light emitted from the light source unit. The optical element is easily deteriorated by the temperature rise. The temperature of the optical element rises by being irradiated with the light emitted from the light source unit. However, the temperature rise of the optical element is prevented by causing the heat from the optical element to be absorbed by the coolant cooled in the interior of the evaporator, so that the life time of the product may be elongated.

Preferably, a heat pipe surrounding the periphery of the optical element is further provided, and part of the heat pipe is fixed to the evaporator for achieving heat exchange.

The cooling of the optical element is achieved uniformly from the periphery thereof by the heat pipe surrounding the periphery of the optical element. Therefore, uneven cooling of the optical element is avoided and deterioration of the optical element may be prevented from being locally proceeded.

Preferably, the optical element is arranged in contact with the evaporator. Since the optical element is arranged in contact with the evaporator, heat from the optical element is allowed to be absorbed directly by the coolant in the interior of the evaporator. Therefore, since a specific component for causing the heat from the optical element to be absorbed by the coolant in the interior of the evaporator is not necessary, a compact and simple configuration is achieved.

Preferably, an optical element heat absorber configured to cause coolant flowing separately from the coolant in the interior of the evaporator to absorb the heat from the optical element, and a piping disposed in the interior of the evaporator for allowing passage of the coolant having absorbed the heat in the optical element heat absorber are provided.

Since the coolant flowing separately from the coolant in the interior of the evaporator is caused to absorb the heat from the optical element and is passed through the piping disposed in the interior of the evaporator, the heat of the coolant flowing separately from the coolant in the interior of the evaporator having absorbed from the optical element may be absorbed by the coolant in the interior of the evaporator.

In many cases, metallic tubes which resist dissipation of the gas-phase coolant out from the piping are used for the piping of an evaporator system in which the gas-phase coolant is present therein. In contrast, since most part of the coolant separated from the coolant in the interior of the evaporator is composed of the liquid-phase coolant, piping formed of the different materials from the metallic tube may be employed for the piping which allows passage of the coolant having absorbed the heat in the optical element heat absorber. For example, by using piping of a material which allows easy bending, a flexible piping path according to the position of the optical element is easily configured so that the flexibility in design of the projector is also enhanced.

Preferably, the optical element heat absorber and the piping are connected by a flexible tube. Since the optical element heat absorber and the piping are connected by the flexible tube, movement of only the optical element heat absorber is achieved without moving the evaporator or the like. Even when the optical element and the optical element heat absorber are integrated, fine adjustment of the position of arrangement of the optical element is easily achieved.

Preferably, the optical element heat absorber includes the heat pipe surrounding the periphery of the optical element and part of the heat pipe is cooled by the coolant flowing separately from the coolant in the interior of the evaporator.

The cooling of the optical element is achieved uniformly from the periphery thereof by the heat pipe surrounding the periphery of the optical element. Therefore, the uneven cooling of the optical element is avoided and deterioration of the optical element may be prevented from being locally proceeded. In addition, since most part of the coolant separated from the coolant in the interior of the evaporator is composed of the liquid-phase coolant, piping formed of the different materials from the metallic tube may be employed for the piping which allows passage of the coolant having absorbed the heat in the optical element heat absorber. For example, by using the piping of a material which allows easy bending, the flexible piping path according to the position of the optical element is easily configured so that the flexibility in design of the projector is also enhanced.

Preferably, the light source heat absorber includes a reflector having a first surface for reflecting light in a visible region and transmitting light in an infrared region and a second surface formed on the opposite side of the first surface, and the second surface is provided with a surface processing which enhances light absorption efficiency. Since the surface processing which enhances the light absorption efficiency is applied on the second surface of the reflector, the light in the infrared region transmitted through the first surface may be absorbed by the second surface. Accordingly, the heat generated by the light in the infrared region may be efficiently absorbed by the coolant in the light source heat absorber.

Preferably, a cooling fan configured to feed air from the radiator toward the light source unit to cool the radiator and the light source unit is further provided. Since the radiator and the light source unit are cooled by the single cooling fan, downsizing of the projector, reduction of the number of components, and reduction of the manufacturing cost are achieved. Also, improvement of the quietness is achieved in comparison with a case of providing a plurality of fans. Even when the air raised in temperature by absorbing the heat from the radiator is fed toward the light source unit, since the temperature of the light source unit is very high, a large temperature difference is secured between the air and the light source unit and a sufficient cooling efficiency is ensured.

Preferably, the radiator and the evaporator are connected via a capillary tube. Since the radiator and the evaporator are connected via the capillary tube, an adequate quantity of coolant according to the pressure difference between the radiator and the interior of the evaporator is supplied to the interior of the evaporator. In other words, necessity to provide a valve or the like to adjust the flow rate of the coolant between the radiator and the evaporator is eliminated, and hence the reduction of the number of components and reduction of the manufacturing cost are achieved.

Preferably, the light source apparatus as the light source unit includes a light-emitting unit configured to emit light and a first reflector configured to reflect illuminating light emitted from the light-emitting unit into a predetermined direction and transmit the light in the infrared region emitted from the light-emitting unit, and the light source heat absorber includes an outlet port being arranged in the periphery of the first reflector to store the light source apparatus therein and allowing the light source apparatus to be taken out in a direction different from the predetermined direction, and absorbs the heat from the light source apparatus, and further includes a second reflector configured to reflect the light in the infrared region transmitting through the first reflector and proceeding to the outlet port toward the light source heat absorber.

Since the light in the infrared region transmitting through the first reflector and proceeding to the outlet port is reflected by the second reflector toward the light source heat absorber, the light in the infrared region may be prevented from leaking from the outlet port portion. Therefore, the heat generated by the light in the infrared region transmitted through the first reflector may be efficiently absorbed by the light source heat absorber.

Preferably, the coolant is evaporated in the light source heat absorber. By the evaporation of the coolant in the light source heat absorber, the coolant is transformed into the gas-phase coolant. The gas-phase coolant flows at a higher velocity than the liquid-phase coolant and hence passes through the ejector pump easily. Since the ejector pump is configured in such a manner that the higher the velocity of the fluid passing through the interior of the ejector pump, the larger the degree of pressure drop becomes, the easiness of the pressure drop in the interior of the evaporator by evaporating the coolant in the light source heat absorber is achieved. By lowering the pressure in the interior of the evaporator to a pressure at which the boiling temperature of the coolant becomes not higher than the ambient temperature, cooling of the coolant in the interior of the evaporator to a temperature not higher than the ambient temperature is also achieved.

Preferably, the heat source is the optical element configured to modulate the light emitted from the light-emitting unit. The optical element is easily deteriorated by the temperature rise. The temperature of the optical element rises by being irradiated with the light emitted from the light-emitting unit. However, the temperature rise of the optical element is prevented by causing the heat from the optical element to be absorbed by the coolant cooled in the interior of the evaporator, so that the life time of the product may be elongated.

A projector according to one embodiment is a projector including a light source apparatus having a light-emitting unit configured to emit light and a first reflector configured to reflect illuminating light emitted from the light-emitting unit to a predetermined direction and transmit light in the infrared region emitted from the light-emitting unit for displaying an image using the illuminating light, and including: a light source heat absorber which is arranged around the first reflector to store the light source apparatus therein, is formed with an outlet port which allows the light source apparatus to be taken out in a direction different from the predetermined direction, and is configured to absorb heat from the light source apparatus; and a second reflector configured to reflect the light in the infrared region transmitting through the first reflector and proceeding to the outlet port toward the light source heat absorber.

Since the light source heat absorber configured to store the light source apparatus is formed with the outlet port, taking out the light source apparatus from the projector is easily achieved. Therefore, replacement of the light source apparatus is easily achieved when the lifetime of the light source apparatus is ended. Also, since the light in the infrared region transmitting through the first reflector and proceeding to the outlet port is reflected by the second reflector toward the light source heat absorber, the light in the infrared region may be prevented from leaking from the outlet port portion. Therefore, the heat generated by the light in the infrared region transmitted through the first reflector may be efficiently absorbed by the light source heat absorber.

Preferably, the second reflector is provided integrally with the light source apparatus. Since the second reflector is provided integrally with the light source apparatus, the second reflector is taken out together when the light source apparatus is taken out, so that the second reflector does not hinder the operation to take out the light source apparatus. Therefore, replacement of the light source apparatus is achieved further easily.

Preferably, the second reflector is integrally formed with a housing which constitutes a shell of the light source apparatus and is deposited with metal on a surface thereof. Since the second reflector is formed integrally with the housing, the second reflector may be formed of the same material as the housing, so that the reduction of the manufacturing cost is achieved. Since the metal is deposited on the surface, even when the material of the housing does not have a property to reflect the light in the infrared region by itself, the property to reflect the light in the infrared region may be imparted to the second reflector.

Preferably, a lid member configured to close the outlet port is further provided, and the second reflector is provided integrally with the lid member. Since the second reflector is provided integrally with the lid member configured to close the outlet port, the second reflector is also removed by removing the lid when taking out the light source apparatus. Therefore, the light source apparatus may be confirmed easily without being hindered by the second reflector, for example, when inspecting the light source apparatus stored in the light source heat absorber. Since the second reflector is provided separately from the light source apparatus, reduction of the cost of the light source apparatus by itself is achieved. Accordingly, reduction of the cost for replacing the light source apparatus is achieved.

Preferably, at least part of an inner wall surface of the light source heat absorber on the side of the first reflector is formed with pits and projections. With the formation of the pits and projections, the surface area of the inner wall surface of the light source heat absorber may be increased. Accordingly, the heat by the light in the infrared region transmitted through the first reflector may be absorbed by the light source heat absorber further efficiently.

Preferably, the light source heat absorber includes an ejector pump having a coolant flow channel formed in the interior thereof to cause the coolant flowing in the coolant flow channel to absorb the heat from the light source apparatus and to allow passage of the coolant having absorbed the heat in the light source heat absorber therethrough, a radiator configured to radiate the heat of the coolant flowed out from the ejector pump, and an evaporator configured to cool the coolant stored in the evaporator by evaporating the coolant, in which the coolant cooled in the evaporator is caused to absorb the heat from the heat sources other than the light source apparatus, and the ejector pump decompresses the interior of the evaporator by a pressure drop due to the passage of the coolant having absorbed the heat in the light source heat absorber.

The projector may have a cooling fan configured to cool the heat sources other than the light source apparatus. However, by causing the heat from the heat source other than the light source apparatus to be absorbed by the coolant cooled by the evaporator, the airflow quantity of the cooling fan may be reduced. Also, depending on the case, necessity of the cooling fan configured to cool the heat sources other than the light source unit may be eliminated. Therefore, the improvement of the quietness of the projector is achieved by reducing the driving noise of the cooling fan. The coolant in the interior of the evaporator is cooled by a loss of vaporization heat thereof at the time of evaporation.

Also, since the interior of the evaporator is decompressed by the ejector pump, the boiling temperature of the coolant in the interior of the evaporator may be lowered. Therefore, even though the temperature in the periphery of the evaporator is almost the same as the ambient temperature, the temperature of the coolant in the interior of the evaporator may be lowered to a level lower than the ambient temperature. With the cooling by the temperature lower than the ambient temperature, the temperature of the heat sources other than the light source apparatus may be further lowered than the air-cooling using air in the casing of about the ambient temperature in the related art.

Also, the projector may cool the heat sources other than the light source apparatus by generating a low temperature by the cooling apparatus provided with the compressor. Since the low temperature is generated by the decompression in the interior of the evaporator by the ejector pump, the power consumption may be reduced in comparison with the case where the cooling apparatus provided with the compressor is used. The downsizing of the ejector pump, being easier than that of the compressor, contributes also to the downsizing of the projector by itself.

Also, since the pressure in the interior of the evaporator is lowered by allowing passage of the coolant having absorbed the heat from the light source unit through the ejector pump, it is not necessary to provide the compressor for lowering the pressure in the interior of the evaporator, so that the downsizing of the apparatus and reduction of the power consumption are achieved.

Preferably, the coolant is evaporated in the light source heat absorber. By the evaporation of the coolant in the light source heat absorber, the coolant is transformed into the gas-phase coolant. The gas-phase coolant flows at a higher velocity than the liquid-phase coolant and hence passes through the ejector pump easily. Since the ejector pump is configured in such a manner that the higher the velocity of the fluid passing through the interior of the ejector pump, the larger the degree of pressure drop becomes, the easiness of the pressure drop in the interior of the evaporator by evaporating the coolant in the light source heat absorber is achieved. By lowering the pressure in the interior of the evaporator to a pressure at which the boiling temperature of the coolant becomes not higher than the ambient temperature, cooling of the coolant in the interior of the evaporator to a temperature not higher than the ambient temperature is also achieved.

Preferably, the heat source is the optical element configured to modulate the light emitted from the light-emitting unit. The optical element is easily deteriorated by the temperature rise. The temperature of the optical element rises by being irradiated with the light emitted from the light-emitting unit. However, the temperature rise of the optical element is prevented by causing the heat from the optical element to be absorbed by the coolant cooled in the interior of the evaporator, so that the life time of the product may be elongated.

In addition, the light source apparatus according to one embodiment includes a light-emitting unit configured to emit light, a first reflector configured to reflect illuminating light emitted from the light-emitting unit to a determined direction and transmit light in an infrared region emitted from the light-emitting unit, and a second reflector configured to reflect the light in the infrared region transmitted through the first reflector.

Since the light source apparatus includes the second reflector configured to reflect the light in the infrared region transmitted through the first reflector, the light in the infrared region may be reflected in a desired direction by the second reflector. For example, by converging the light in the infrared region in a certain region, a place where the heat is generated by the light in the infrared region may be defined.

Preferably, the light source apparatus is used by being stored in the light source absorber provided in the projector for absorbing the heat from the light source apparatus, and the second reflector reflects the light in the infrared region toward the light source heat absorber. Since the second reflector reflects the light in the infrared region toward the light source heat absorber, the heat generated by the light in the infrared region is caused to be absorbed by the light source heat absorber efficiently.

BRIEF DESCRIPTION OF THE DRAWINGS

The embodiments will be described with reference to the accompanying drawings wherein like numbers reference like elements.

DESCRIPTION OF EXEMPLARY EMBODIMENTS

Figure 1:
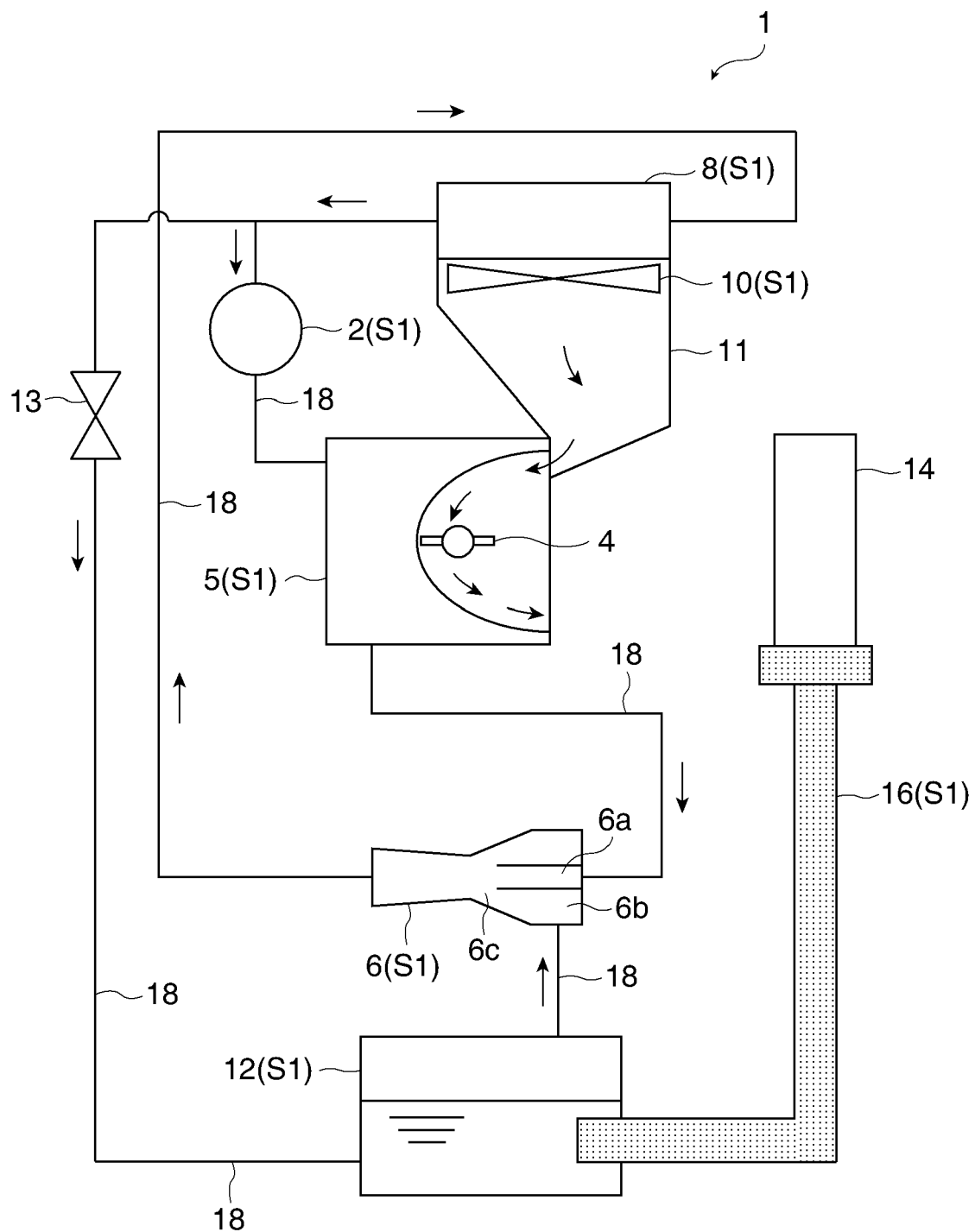
FIG. 1 shows a schematic configuration of a projector according to a first embodiment.

Referring now to the drawings, embodiments will be described in detail.

First Embodiment

FIG. 1 shows a schematic configuration of a projector according to a first embodiment. A projector 1 is a front projecting type projector configured to supply light to a screen (not shown) for allowing viewers to appreciate an image by observing light reflected on the screen. The projector 1 cools a light-emitting tube (light source unit) 4 and a spatial light modulator (optical element) 14 as heat sources by a cooling system S1. The cooling system S1 roughly includes a circulating pump 2, an absorbing evaporator 5, an ejector pump 6, a radiator (heat radiator) 8, a cooling fan 10, a low-temperature heat exchanger (evaporator) 12, and a heat transfer unit 16. The circulating pump 2, the absorbing evaporator (light source heat absorber) 5, the ejector pump 6, the radiator 8, and the low-temperature heat exchanger 12 are connected via coolant tubes 18.

The circulating pump 2 functions as a power source for circulating coolant through the absorbing evaporator 5, the ejector pump 6, the radiator 8, and the low-temperature heat exchanger 12 connected to each other via the coolant tubes 18. As the coolant, for example, water, hydrofluoroether, fluorinated inactive liquid, propylene glycol, or ethylene glycol is used.

The light-emitting tube 4 is, for example, an extra-high pressure mercury lamp. The light-emitting tube 4 emits light by the formation of an ark between electrodes, not shown, and rises in temperature to a very high temperature of 800° C. to 1000° C. when it emits the light.

Figure 2:
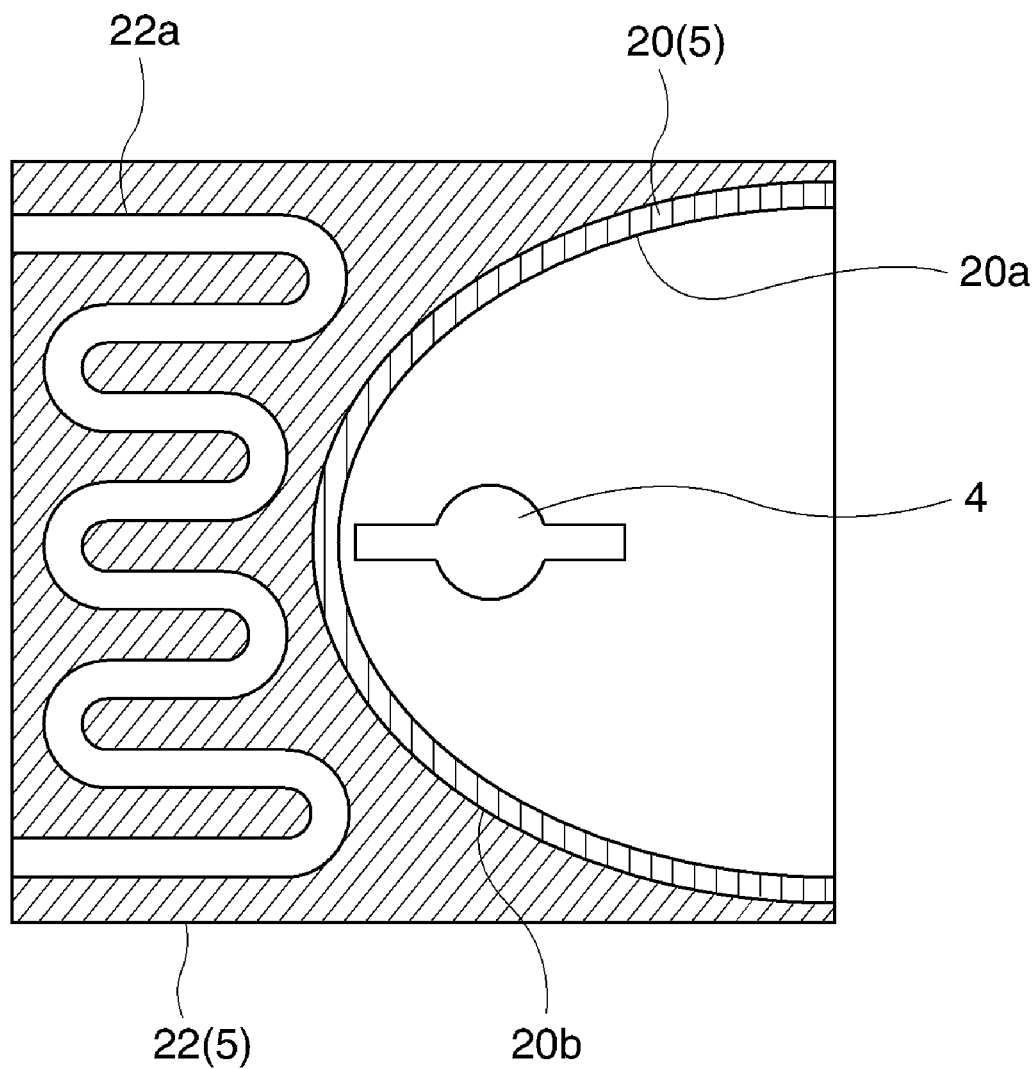
FIG. 2 is a cross-sectional view showing a schematic configuration of an absorbing evaporator according to the first embodiment.

FIG. 2 is a cross-sectional view showing a schematic configuration of the absorbing evaporator 5. The absorbing evaporator 5 includes a reflector 20 and a heat-absorbing block 22. A surface (first surface 20a) of the reflector 20 opposing the light-emitting tube 4 is a cold mirror which reflects light in a visible region but transmits the light in the infrared region and light in an ultraviolet region. The reflector 20 reflects the light in the visible region from light emitted from the light-emitting tube 4 toward the spatial light modulator 14. A surface (second surface 20b) of the reflector 20 on the opposite side from the first surface 20a is applied with a surface processing for enhancing light absorption efficiency. For example, a surface processing which provides an emissivity of 0.8 or higher is applied on the second surface 20b, so that most part of the light in the infrared region transmitted through the first surface 20a is absorbed by the second surface 20b. Since the second surface 20b absorbs most part of the light in the infrared region, the area which is raised in temperature by the light in the infrared region transmitted through the first surface 20a may be confined to a portion of the second surface 20b.

The heat-absorbing block 22 is arranged on the second surface 20b side of the reflector 20. The heat-absorbing block 22 is a block material in which a metallic material having a high thermal conductivity such as aluminum is filled, and is formed with a flow channel 22a for allowing passage of the coolant therethrough in the interior thereof so as to assume a three-dimensional serpentine. The heat-absorbing block 22 is provided in contact with the second surface 20b of the reflector 20 and heat generated on the second surface 20b is transferred to the heat-absorbing block 22. The heat transferred to the heat-absorbing block 22 is absorbed by the coolant passing through the flow channel 22a in the heat-absorbing block 22. The temperature of the heat-absorbing block 22 is also raised by the high-temperature light-emitting tube 4, and the heat thereof is absorbed by the coolant. The temperature of the heat-absorbing block 22 is raised to a temperature higher than the boiling temperature of the coolant by heat generated by the light in the infrared region emitted from the light-emitting tube 4 and the heat transferred from the light-emitting tube 4 by itself, whereby the coolant passing through the flow channel 22a is evaporated and is transformed into a gas-phase coolant.

The ejector pump 6 assumes a double-nozzle shape in which a sub nozzle 6b surrounds the periphery of a main nozzle 6a coaxially. A wall surface of the main nozzle 6a is formed with a communication hole 6c which communicates the main nozzle 6a and the sub nozzle 6b. The absorbing evaporator 5 is connected to the main nozzle 6a of the ejector pump 6 via the coolant tube 18, and the coolant transformed into the gas phase by the heat-absorbing block 22 flows thereto. The low-temperature heat exchanger 12 is connected to the sub nozzle 6b of the ejector pump 6 via the coolant tube 18.

When the coolant passes through the interior of the main nozzle 6a, the pressure in the sub nozzle 6b is decompressed via the communication hole 6c. Accordingly, the interior of the low-temperature heat exchanger 12 connected to the sub nozzle 6b is decompressed. In other words, the ejector pump 6 functions as a decompressor configured to decompress the interior of the low-temperature heat exchanger 12. The coolant is stored in the interior of the low-temperature heat exchanger 12 as described later in detail. The interior of the low-temperature heat exchanger 12 is decompressed by the ejector pump 6, and hence the boiling temperature of the coolant is lowered, and the coolant is easily evaporated. The gas-phase coolant is generated by the evaporation of the coolant in the interior of the low-temperature heat exchanger 12, and the gas-phase coolant absorbs the vaporization heat from the liquid-phase coolant at the time of the evaporation of the coolant. The gas-phase coolant generated in the low-temperature heat exchanger 12 is drawn into the main nozzle 6a via the sub nozzle 6b, joins the gas-phase coolant fed from the absorbing evaporator 5, and then is delivered to the radiator 8. The faster the velocity of the fluid passing in the interior of the main nozzle 6a of the ejector pump 6, the higher the decompression effect with respect to the sub nozzle 6b becomes. In the first embodiment, since the coolant passing through the main nozzle 6a is evaporated by the absorbing evaporator 5 and is transformed into the gas-phase coolant, it is allowed to pass through the interior of the main nozzle 6a at a higher velocity than that of the gas-phase coolant. Therefore, the decompression effect of the sub nozzle 6b is enhanced, so that the pressure in the interior of the low-temperature heat exchanger 12 may further be lowered. Accordingly, a temperature which is further lower than an evaporating temperature of the coolant in the interior of the low-temperature heat exchanger 12 is achieved.

The radiator 8 radiates heat that the coolant absorbs in the absorbing evaporator 5 and heat absorbed by the low-temperature heat exchanger 12 as the vaporization heat to the outside air. A flow channel (not shown) in which the coolant flows is formed in the interior of the radiator 8. The gas-phase coolant delivered from the ejector pump 6 is condensed by being cooled in the course of flowing in the flow channel in the radiator 8 and is transformed into the liquid-phase coolant. The coolant passed through the radiator 8 proceeds toward the absorbing evaporator 5 via the circulating pump 2. Since the liquid-phase coolant is hardly reduced in volume when being pumped in comparison with the gas-phase coolant, the circulating pump 2 configured to pump the liquid-phase coolant may be of the on smaller than the compressor for pumping the gas-phase coolant.

The coolant tube 18 which connects the radiator 8 and the absorbing evaporator 5 is branched at a midsection thereof and is connected to the low-temperature heat exchanger 12. Therefore, part of the coolant flowed out from the radiator 8 proceeds toward the low-temperature heat exchanger 12 and is stored in the interior thereof.

The cooling fan 10 enhances the cooling efficiency of the coolant by circulating air around the radiator 8. A duct (air passage) 11 is provided around the around the cooling fan 10, so that the air circulated by the cooling fan 10 proceeds toward the light-emitting tube 4. Air having absorbed the heat of the coolant in the radiator 8 is fed toward the light-emitting tube 4 by the cooling fan 10, and cools the light-emitting tube 4. Since the temperature of the light-emitting tube 4 is raised to a very high temperature, the temperature difference of the air and the light-emitting tube 4 is significantly large even though the air is raised in temperature by absorbing the heat of the coolant in the radiator 8, and hence cooling of the light-emitting tube 4 is achieved with sufficient cooling efficiency. Also, since cooling of the radiator 8 and the cooling of light-emitting tube 4 are achieved with the single cooling fan 10, this configuration contributes to downsizing, reduction of the number of components, and reduction of the manufacturing cost of the projector 1 in comparison with a case of providing fans for cooling the respective members of the radiator 8 and the light-emitting tube 4. Also, improvement of quietness is achieved in comparison with a case of providing a plurality of the fans. However, the invention is not intended to exclude cooling of the radiator 8 and the light-emitting tube 4 with the separate fans. A configuration in which the cooling fan 10 is configured to serve simultaneously as other fans arranged in the projector in the related art such as a fan for cooling the power source or a fan for exhausting air in a projector casing.

The low-temperature heat exchanger 12 cools the coolant by evaporating the coolant stored in the interior thereof. The coolant is cooled by a loss of vaporization heat thereof at the time of evaporation within the low-temperature heat exchanger 12. The interior of the low-temperature heat exchanger 12 is decompressed by the ejector pump 6, and hence the boiling temperature of the coolant is lowered. Accordingly, the temperature of the coolant stored in the interior of the low-temperature heat exchanger 12 is cooled to a temperature around the boiling temperature. By decompressing the interior of the low-temperature heat exchanger 12 at which the boiling temperature of the coolant becomes not higher than the ambient temperature, cooling of the coolant in the interior of the low-temperature heat exchanger 12 to a temperature not higher than the ambient temperature is achieved. The coolant tube 18 connecting the radiator 8 and the low-temperature heat exchanger 12 is provided with a valve 13 configured to adjust the flow rate of the coolant. By adjusting the flow rate of the coolant proceeding toward the low-temperature heat exchanger 12 by the valve 13, the liquid-phase coolant in the interior of the low-temperature heat exchanger 12 may be prevented from being drawn into the ejector pump 6.

The spatial light modulator 14 is a transmissive liquid crystal display apparatus configured to modulate the light emitted from the light-emitting tube 4 according to image signals. The light modulated by the spatial light modulator 14 is projected on the screen (not shown), and a video is displayed thereon. The temperature of the spatial light modulator 14 rises by being irradiated with the light emitted from the light-emitting tube 4. The heat generated in the spatial light modulator 14 is transferred through the heat transfer unit 16 and is absorbed by the coolant in the interior of the low-temperature heat exchanger 12.

The heat transfer unit 16 is formed of a material with a high thermal conductivity, for example, the metallic material such as aluminum or copper. The heat transfer unit 16 is provided in a state of being in contact with both the spatial light modulator 14 and the liquid-phase coolant in the interior of the low-temperature heat exchanger 12. The heat generated in the spatial light modulator 14 is transferred through the heat transfer unit 16 and is absorbed by the coolant in the interior of the low-temperature heat exchanger 12, and the spatial light modulator 14 is cooled. Accordingly, deterioration of the spatial light modulator 14 due to the temperature rise is prevented, so that elongation of the lifetime of the projector 1 is achieved.

Figure 3:
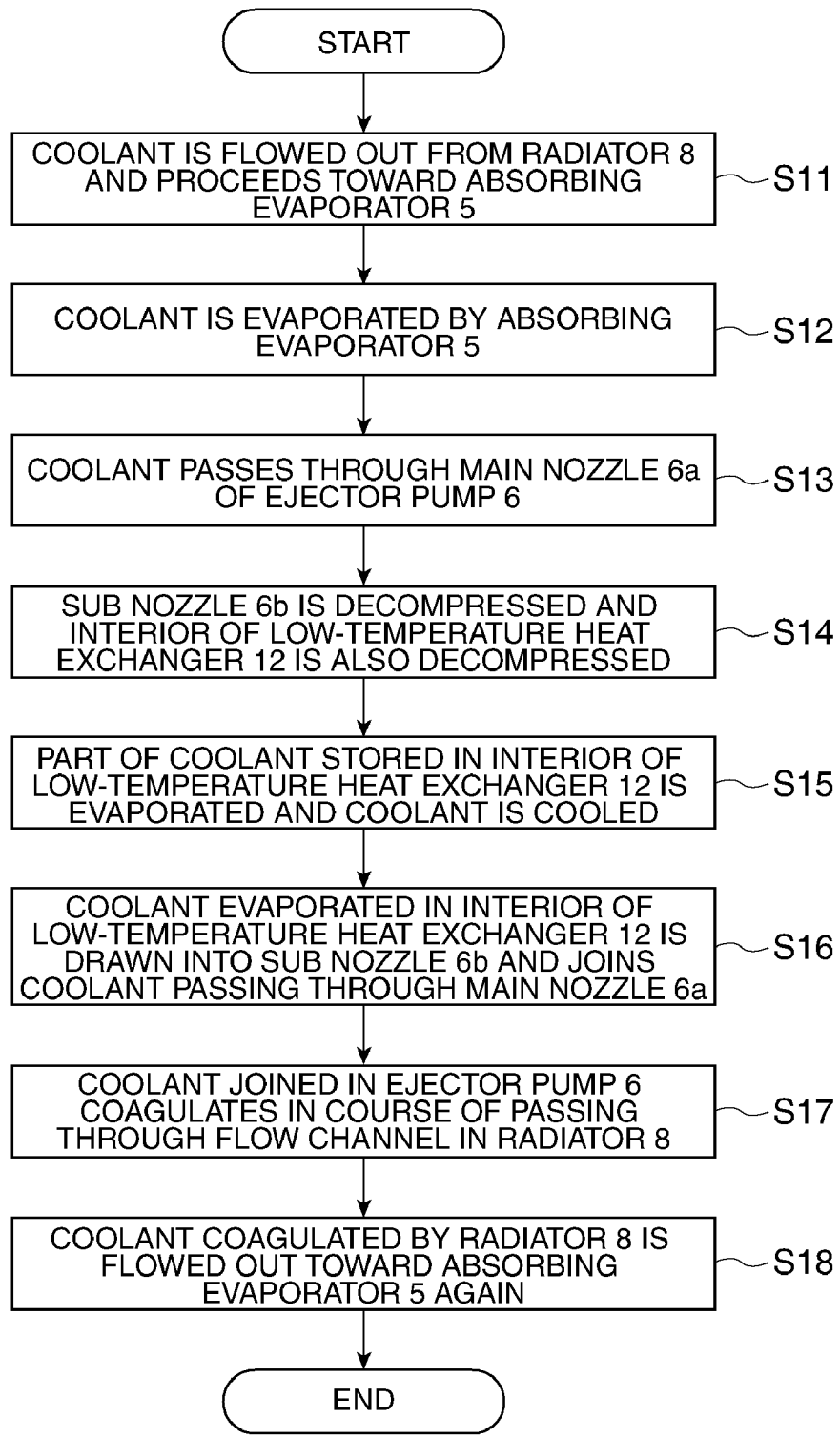
FIG. 3 is a flowchart for explaining a flow of circulation of a coolant according to the first embodiment.

Referring now to a flowchart in FIG. 3, a flow of the circulation of the coolant in the cooling system S1 will be described.

The coolant is flowed out from the radiator 8 and proceeds toward the absorbing evaporator 5 (Step S11). The coolant flowed out from the radiator 8 is evaporated by the absorbing evaporator 5 (Step S12). When the coolant transformed into the gas phase by being evaporated by the absorbing evaporator 5 passes though the main nozzle 6a of the ejector pump 6 (Step S13), the interior of the sub nozzle 6b is decompressed, whereby the interior of the low-temperature heat exchanger 12 is also decompressed (Step S14). Part of the coolant flowed from the radiator 8 is stored in the interior of the low-temperature heat exchanger 12, and the stored part of the coolant is evaporated by the decompression in the interior of the low-temperature heat exchanger 12, so that the coolant is cooled (Step S15). The coolant transformed into the gas phase by being evaporated in the interior of the low-temperature heat exchanger 12 is drawn into the sub nozzle 6b, and joins the coolant passing through the main nozzle 6a (Step S16). The coolant joined in the ejector pump 6 is flowed into the radiator 8, and coagulates due to a loss of heat by being absorbed by the outside air in the course of passing through the flow channel in the radiator 8 (Step S17). The coolant coagulated in the radiator 8 flows out toward the absorbing evaporator 5 again (Step S18).

As described above, since the projector 1 according to this embodiment cools the spatial light modulator 14 by causing the coolant cooled in the low-temperature heat exchanger 12 to absorb the heat generated in the spatial light modulator 14, deterioration of the spatial light modulator 14 is prevented so that elongation of the lifetime of the projector 1 as a product is achieved. Also, since the coolant is evaporated using the heat of the light-emitting tube 4 at a very high temperature and the coolant transformed into the gas phase by the evaporation is caused to pass though the ejector pump 6, the interior of the low-temperature heat exchanger 12 is sufficiently decompressed. Since the interior of the low-temperature heat exchanger 12 is sufficiently decompressed, lowering of the evaporating temperature of the coolant stored in the interior thereof is achieved. When the evaporating temperature of the coolant is lowered, sufficient cooling of the coolant in the interior of the low-temperature heat exchanger 12 is achieved even in an environment of about the ambient temperature, so that the temperature of the coolant may be lowered to a temperature lower than the room temperature. Since the spatial light modulator 14 is cooled by the coolant sufficiently cooled, a cooling effect is enhanced. Since the spatial light modulator 14 is cooled by causing the coolant cooled by the low-temperature heat exchanger 12 to absorb the heat, the reduction of the number of components is achieved. Also, even when the fan configured to cool the spatial light modulator 14 is provided, since the cooling of the spatial light modulator 14 is achieved with a small airflow quantity, the improvement of the quietness of the projector 1 is achieved by reducing the driving noise of the fan.

Vapor to be passed through the main nozzle 6a of the ejector pump 6 configured to decompress the interior of the low-temperature heat exchanger 12 is generated by a thermal energy generated by the light-emitting tube 4, which is thrown away in the related art, the reduction of the power consumption is achieved in comparison with the case of using the cooling apparatus provided with the compressor.

The downsizing of the ejector pump 6, being easier than that of the compressor, contributes also to downsizing of the cooling system S1, and hence of the projector 1.

Figure 4:
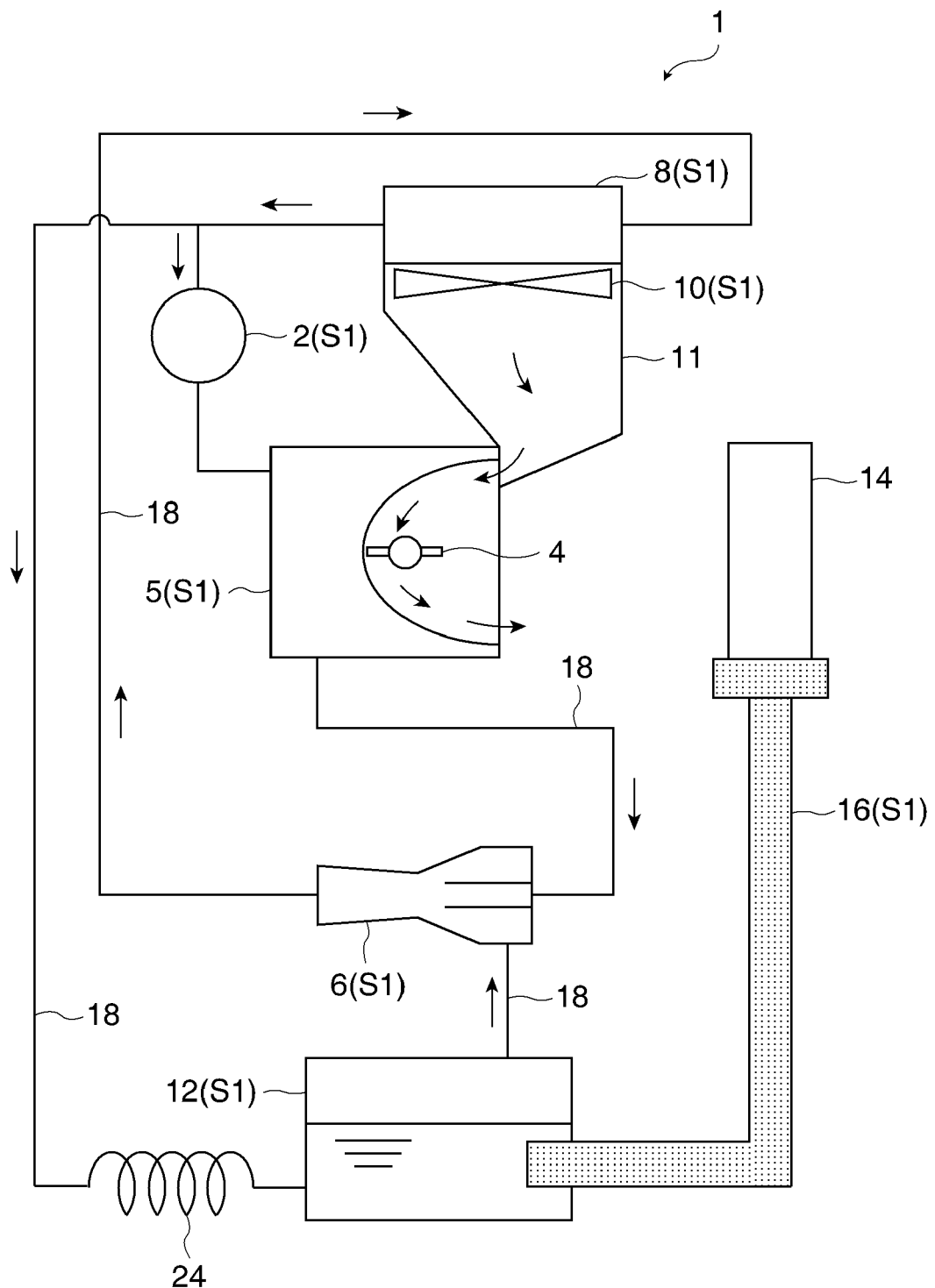
FIG. 4 shows a schematic configuration of the projector according to a first modification of the first embodiment.

FIG. 4 shows a schematic configuration of the projector 1 according to a first modification of the first embodiment. The like elements are designated by the same numbers as in the configurations described above and overlapped description will be omitted.

The cooling system S1 of the projector 1 in the first modification includes a capillary tube 24 between the radiator 8 and the low-temperature heat exchanger 12. The capillary tube 24 is configured into a capillary in the interior thereof, and allows passage of the coolant of an amount corresponding to the pressure difference of the coolant between an inlet side and an outlet side of the capillary tube 24. Therefore, an adequate amount of coolant is allowed to flow into the low-temperature heat exchanger 12 without providing the valve 13 for adjusting the flow rate of the coolant between the radiator 8 and the low-temperature heat exchanger 12. Since the valve 13 is not necessary, this configuration contributes to the reduction of the number of components and the downsizing of the projector 1.

Figure 5:
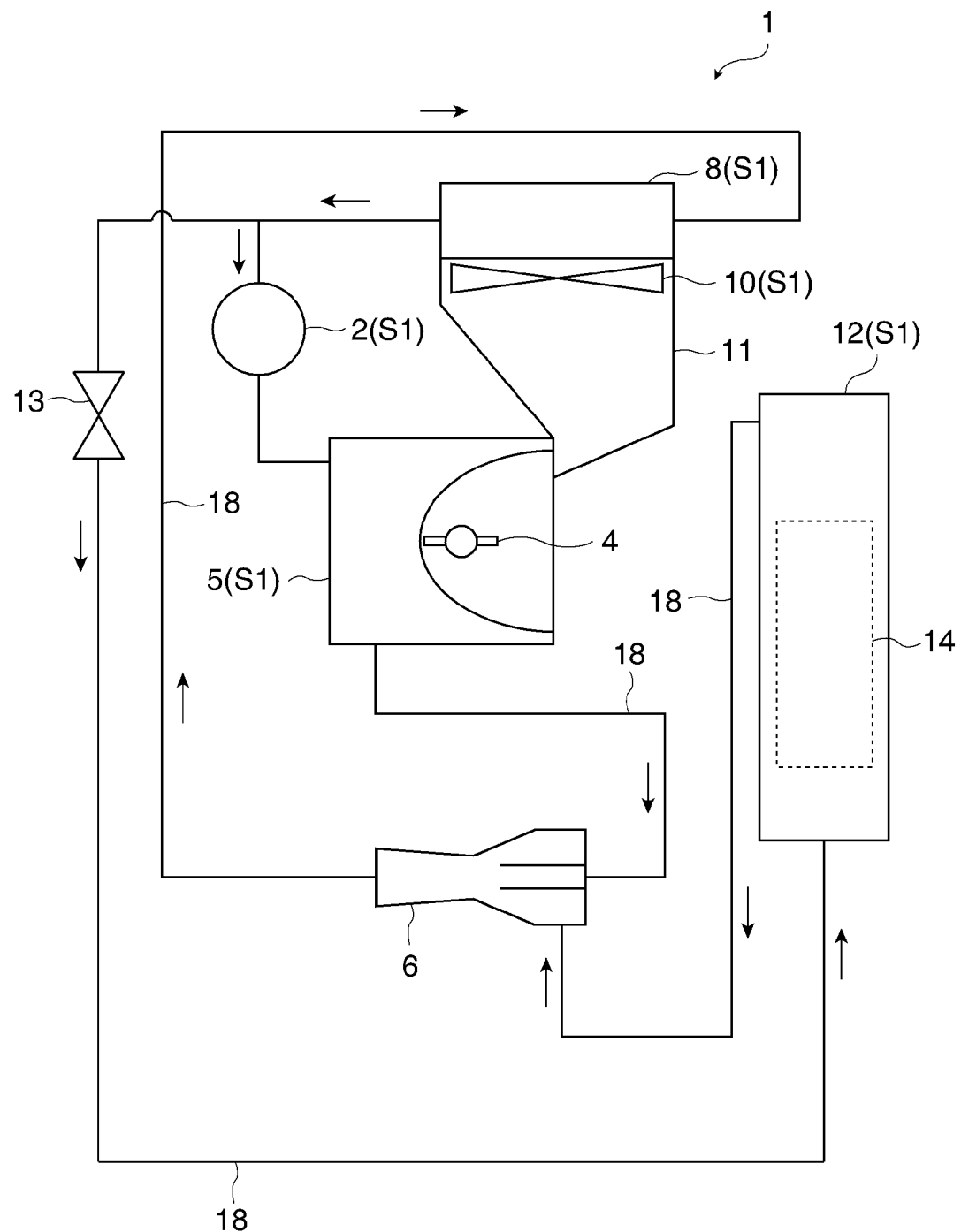
FIG. 5 shows a schematic configuration of the projector according to a second modification of the first embodiment.
Figure 6:
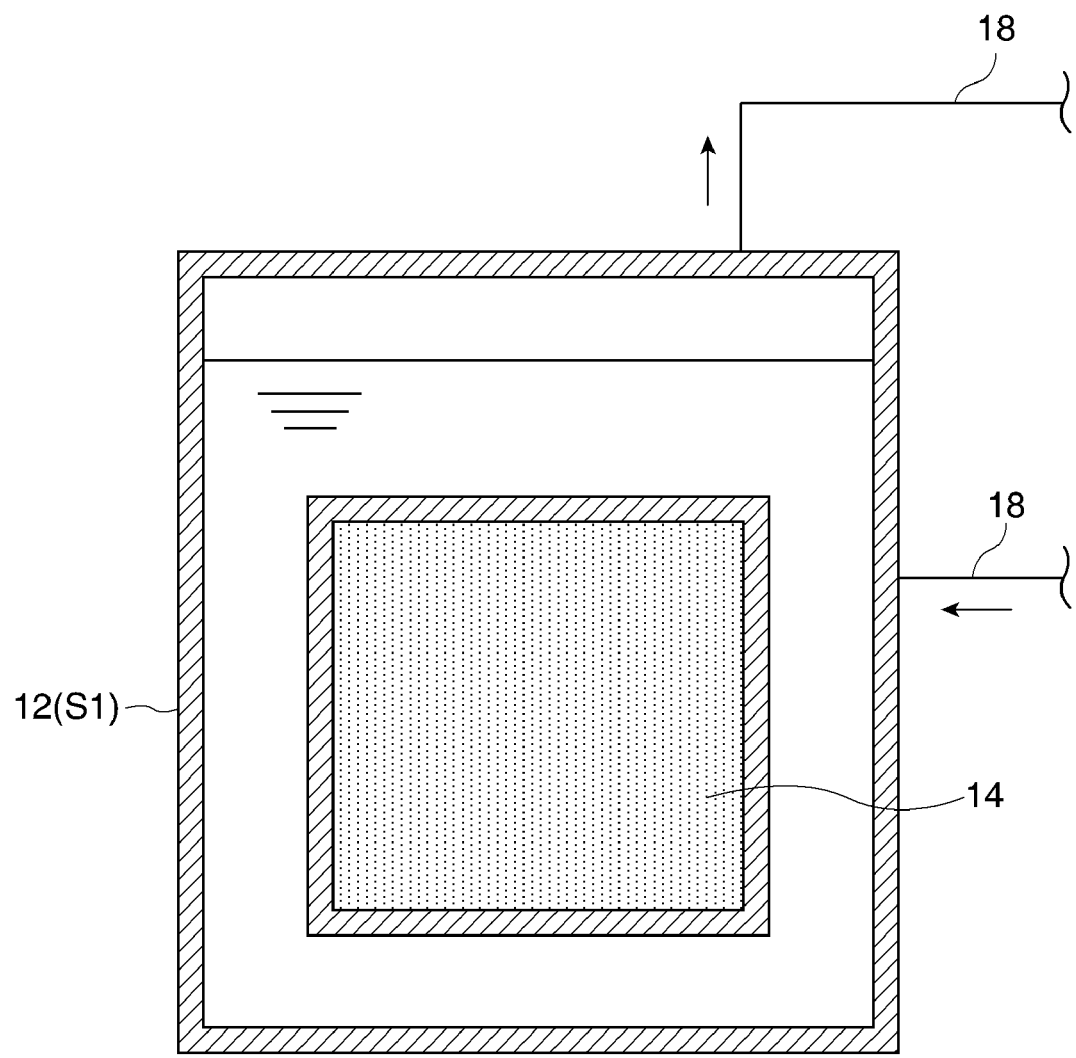
FIG. 6 is a cross-sectional view of a low-temperature heat exchanger and a spatial light modulator according to the first embodiment viewed from the side of a light-emitting tube.

FIG. 5 shows a schematic configuration of the projector 1 according to a second modification of the first embodiment. FIG. 6 is a cross-sectional view of the low-temperature heat exchanger 12 and the spatial light modulator 14 when viewed from the light-emitting tube 4 side. The like elements are designated by the same numbers as in the configurations described above and overlapped description will be omitted.

In the cooling system S1 of the projector 1 according to the second modification, the low-temperature heat exchanger 12 is configured so as to surround the periphery of the spatial light modulator 14. The spatial light modulator 14 is in contact with the low-temperature heat exchanger 12 in the periphery thereof. In this configuration, direct absorption of the heat generated by the spatial light modulator 14 by the coolant in the interior of the low-temperature heat exchanger 12 is efficiently achieved. Also, since the low-temperature heat exchanger 12 functions as the optical element heat absorbers necessity of the component such as the heat transfer unit 16 is eliminated, which contributes to the reduction of the number of components and downsizing of the projector 1.

Second Embodiment

Figure 7:
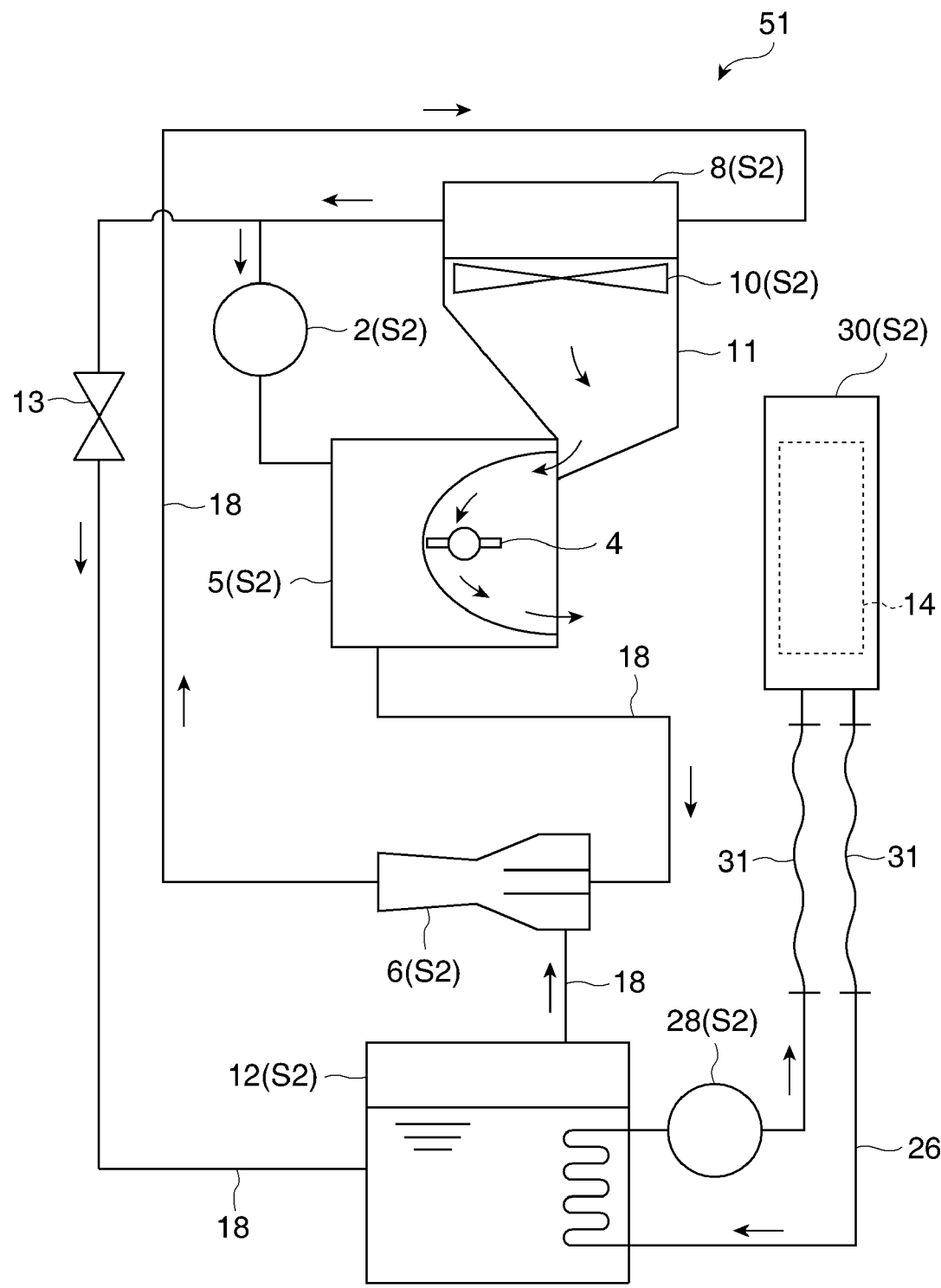
FIG. 7 shows a schematic configuration of the projector according to a second embodiment.

FIG. 7 shows a schematic configuration of a projector 51 according to a second embodiment. The like elements are designated by the same numbers as in the first embodiment and overlapped description will be omitted. A cooling system S2 of the projector 51 according to the second embodiment is characterized in that the spatial light modulator 14 is cooled using a heat pipe 30 which surrounds the periphery of the spatial light modulator 14 and in that part of the heat pipe 30 is brought into contact with a piping system (heat pipe circulating system) disposed partly in the interior of the evaporator to cause the coolant in the heat pipe circulation system to absorb the heat from the spatial light modulator 14 and cool the same.

Figure 8:
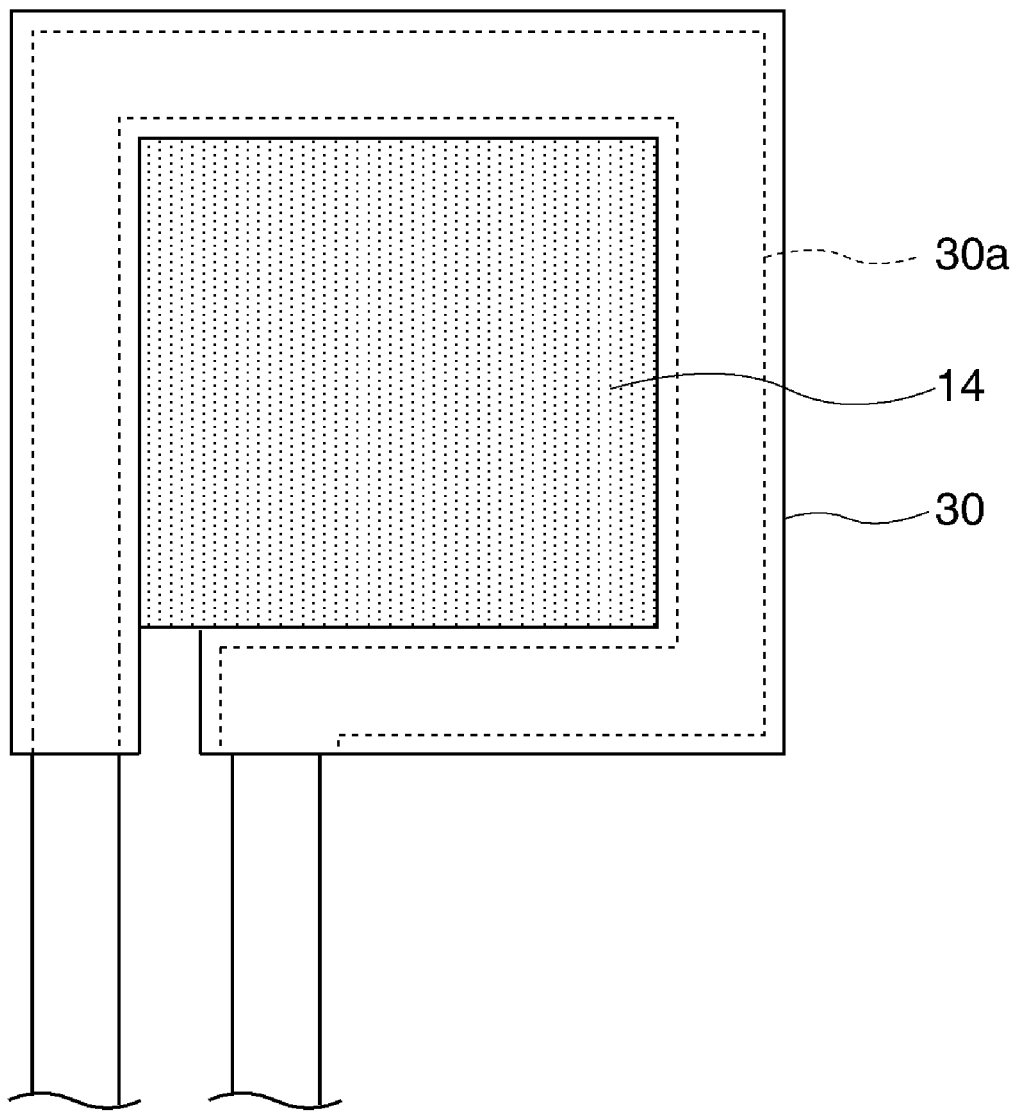
FIG. 8 is a drawing of the spatial light modulator and a heat pipe according to the second embodiment viewed from the side of the light-emitting tube.

FIG. 8 is a front view of the spatial light modulator 14 and the heat pipe (optical element heat absorber) 30 viewed from the light-emitting tube 4 side. The heat pipe 30 is arranged so as to surround the periphery of the spatial light modulator 14 and in contact with the spatial light modulator 14. The heat pipe 30 is formed of a material with a high thermal conductivity, for example, the metallic material such as aluminum or copper. The heat pipe circulation system includes the heat pipe 30 and the heat pipe coolant tube (piping) 26 configured to circulate the coolant by being connected to the heat pipe 30. The heat pipe circulation system is a piping of a system different from the system in which the evaporator 12 or the like is assembled, and a coolant separated from the coolant in the evaporator 12 flows in the heat pipe circulation system. A heat pipe circulating pump 28 as the power source to cause the coolant to circulate is provided at a midsection of the heat pipe coolant tube 26.

The heat generated by the temperature rise of the spatial light modulator 14 is absorbed by the coolant flowing in the heat pipe coolant tube 26 via the heat pipe 30. Therefore, the spatial light modulator 14 is cooled uniformly from the periphery by the heat pipe 30. Since the spatial light modulator 14 is cooled uniformly from the periphery, the temperature distribution of the spatial light modulator 14 is prevented from deviating and hence a stable light modulation is enabled. Also, deterioration of the spatial light modulator 14 due to the temperature rise is prevented, so that elongation of the lifetime of the projector 51 is achieved.

The heat pipe coolant tube 26 is disposed partly in the interior of the low-temperature heat exchanger 12. The heat from the spatial light modulator 14 absorbed by the heat pipe 30 is absorbed by the coolant cooled in the interior of the low-temperature heat exchanger 12 in the course of passing through the interior of the low-temperature heat exchanger 12. Then, the heat from the spatial light modulator 14 is absorbed again by the heat pipe 30.

Since only the liquid-phase coolant flows in the heat pipe circulation system, the coolant in the piping can hardly dissipate to the outside of the piping. Therefore, at least part of the heat pipe coolant tube 26 is formed of a flexible rubber tube 31. Accordingly, when moving the heat pipe 30 and the spatial light modulator 14, the necessity to move the absorbing evaporator 5, the low-temperature heat exchanger 12 or the like is eliminated. Although fine adjustment of the position of arrangement of the spatial light modulator 14 might be required in the manufacturing process of the projector 51, since the movement of the cooling system S2 as a whole is not necessary, the fine adjustment of the position of arrangement of the spatial light modulator 14 is easily achieved. As the flexible tube, an accordion-shaped metallic piping or the like may be employed as well as the rubber tube 31.

In the second embodiment, the coolant flowing in a flow channel 30a of the heat pipe 30 is separated as an independent heat pipe circulation system. However, the invention is not limited thereto, and a configuration in which the heat pipe 30 and the low-temperature heat exchanger 12 are fixed in contact with each other, and the heat pipe 30 is cooled directly by the low-temperature heat exchanger 12 is also applicable.

Third Embodiment

Figure 9:
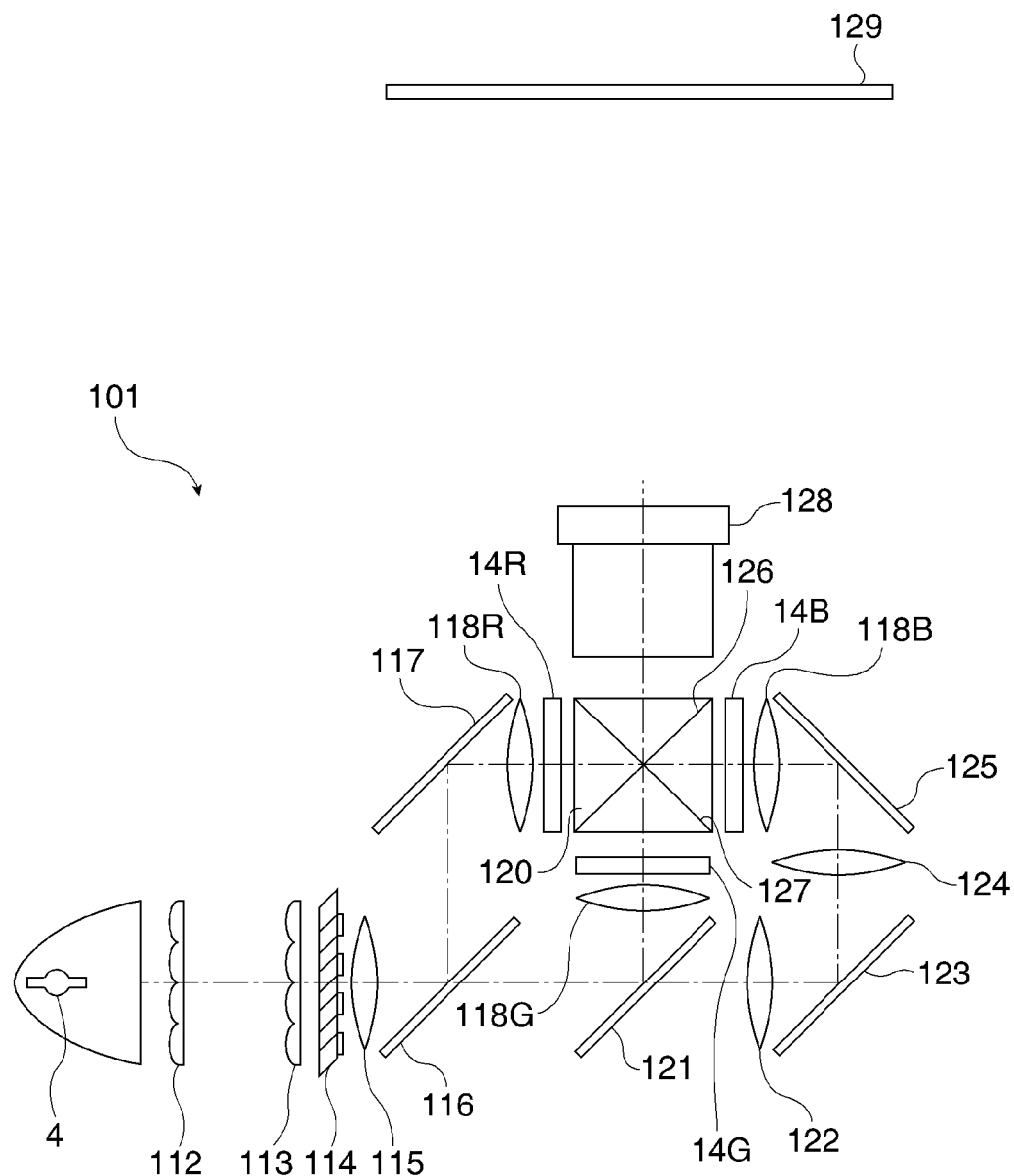
FIG. 9 shows a schematic configuration of the projector according to a third embodiment.

FIG. 9 shows a schematic configuration of a projector 101 according to a third embodiment. The like elements are designated by the same numbers as in the first embodiment and overlapped description will be omitted.

The light-emitting tube 4 is a light source unit configured to emit light including red (R) light, green (G) light, and blue (B) light, and is an extra-high pressure mercury lamp, for example.

A first integrator lens 112 and a second integrator lens 113 each include a plurality of lens elements arranged in an array. The first integrator lens 112 divides a luminous flux from the light-emitting tube 4 into a plurality of parts. The respective lens elements of the first integrator lens 112 focus the luminous flux from the light-emitting tube 4 in the vicinity of the lens elements of the second integrator lens 113. The lens elements of the second integrator lens 113 form images of the lens elements of the first integrator lens 112 on the spatial light modulator.

The light having passed through the two integrator lenses 112, 113 is transformed into a linear polarized light in the direction of a specific direction of vibrations by a polarization transforming element 114. The superimpose lens 115 superimposes the images of the respective lens elements of the first integrator lens 112 on the spatial light modulator. The first integrator lens 112, the second integrator lens 113, and the superimpose lens 115 uniformize the light intensity distribution from the light-emitting tube 4 on the spatial light modulator. The light from the superimpose lens 115 enters a first dichroic mirror 116. The first dichroic mirror 116 reflects R-light and transmits G-light and B-light. An optical path of the R-light reflected by the first dichroic mirror 116 is bent by the first dichroic mirror 116 and the reflection mirror 117, respectively, and enters an R-light field lens 118R. The R-light field lens 118R collimates the R-light from a reflection mirror 117, and causes the same to enter an R-light spatial modulator 14R.

The R-light spatial modulator 14R is a spatial light modulator configured to modulate the R-light according to the image signals. The R-light modulated by the R-light spatial modulator 14R enters a cross dichroic prism 120 which is a color combining optical system.

The G-light and the B-light transmitted through the first dichroic mirror 116 enter a second dichroic mirror 121. The second dichroic mirror 121 reflects the G-light and transmits the B-light. An optical path of the G-light reflected by the second dichroic mirror 121 is bent by the second dichroic mirror 121, and enters a G-light field lens 118G. The G-light field lens 118G collimates the G-light from the second dichroic mirror 121, and causes the same to enter a G-light spatial modulator 14G. The G-light spatial modulator 14G is a spatial light modulator configured to modulate the G-light according to the image signals. The G-light modulated by the G-light spatial modulator 14G enters a surface of the cross dichroic prism 120 different from the surface where the R-light enters.

The B-light having transmitted through the second dichroic mirror 121 transmits through a relay lens 122, and an optical path thereof is bent by reflection from a reflection mirror 123. The B-light from the reflection mirror 123 is further transmitted through a relay lens 124 and, after having been bent the optical path thereof by the reflection from a reflection mirror 125, enters a B-light field lens 118B. Since the optical path of the B-light is longer than the optical path of the R-light and the optical path of the G-light, a relay optical system using the relay lenses 122, 124 is employed in the optical path of the B-light in order to equalize the illumination magnification in the spatial light modulator with lights in other colors.

The B-light field lens 118B collimates the B-light from the reflection mirror 125, and causes the same to enter the B-light spatial modulator 14B. The B-light spatial modulator 14B is a spatial light modulator configured to modulate the B-right according to the image signals. The B-light modulated by the B-light spatial modulator 14B enters a surface of the cross dichroic prism 120 different from the surface where the R-light enters and the surface where the G-light enters.

The cross dichroic prism 120 includes two dichroic films 126, 127 arranged substantially orthogonally to each other. The first dichroic film 126 reflects the R-light and transmits the G-light and the B-light. The second dichroic film 127 reflects the B-light and transmits the R-light and the G-light. The cross dichroic prism 120 combines the R-light, the G-light, and the B-light entered from different directions respectively, and emits the combined light toward a projection lens 128A. The projection lens 128 projects the light combined by the cross dichroic prism 120 toward a screen 129 and displays an image on the screen 129.

The light-emitting tube 4, the R-light spatial modulator 14R, the G-light spatial modulator 14G, and the B-light spatial modulator 14B as the heat sources in the projector 101 according to the third embodiment are cooled using the cooling system described in the first embodiment. Accordingly, deteriorations of the R-light spatial modulator 14R, the G-light spatial modulator 14G, and the B-light spatial modulator 14B are prevented, so that elongation of the lifetime of the projector 101 as the product is achieved.

Fourth Embodiment

Figure 10:
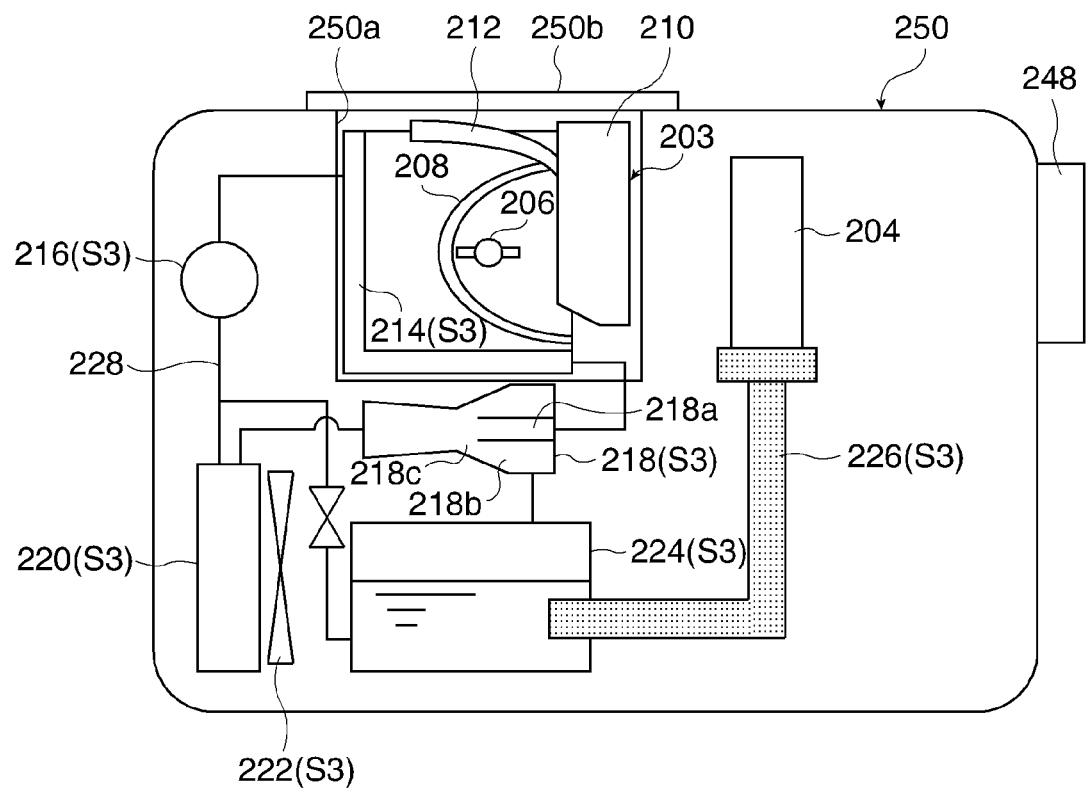
FIG. 10 shows a schematic configuration of the projector according to a fourth embodiment.

FIG. 10 shows a schematic configuration of the projector according to a fourth embodiment. A projector 201 includes a light source apparatus 203, a spatial light modulator (optical element) 204, and a cooling system S3 in the interior of a casing 250. The casing 250 is formed with a light-source storage unit 250*a* for storing the light source apparatus 203. The light-source storage unit 250*a* is closed by a lid member 250*b*. The projector 201 is the front projecting type projector configured to supply light from the light source apparatus to the screen (not shown) via a projection lens 248 for allowing the viewers to appreciate the image by observing the light reflected on the screen. In the description of the fourth embodiment, an axis extending from the light source apparatus 203 toward the projection lens 248 is expressed as a Z-axis. Axes extending orthogonally to the Z-axis and intersecting vertically with respect to each other are expressed as an X-axis and a Y-axis. The directions indicated by arrows of the respective axes are expressed as positive directions and the opposite directions therefrom are expressed as negative directions.

Figure 11:
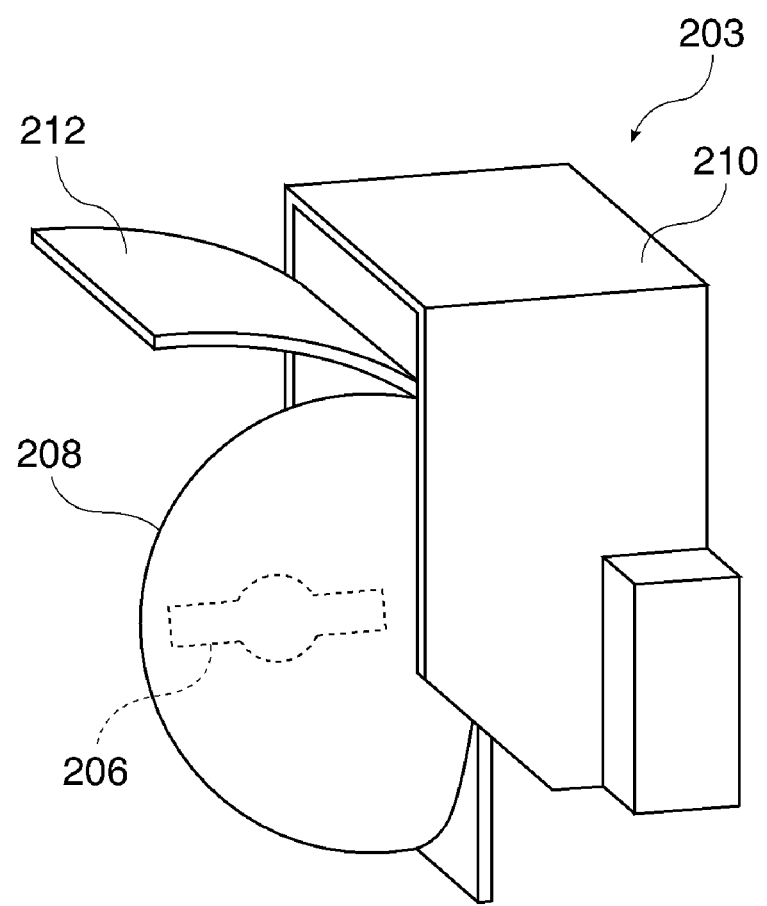
FIG. 11 is an appearance perspective view of a light source apparatus according to the fourth embodiment.

FIG. 11 is an appearance perspective view of the light source apparatus 203. The light source apparatus 203 includes a light emitting tube (light emitter) 206, a reflector 208 (first reflector), a housing 210, and an IR reflection mirror (second reflector) 212. The light emitting tube 206 is, for example, the extra-high pressure mercury lamp. The light emitting tube 206 emits light by the formation of the ark between the electrodes, not shown, and rises in temperature to a very high temperature of 800° C. to 1000° C. when it emits the light.

The light emitting tube 206 is attached to the reflector 208. Visible light from the light emitted from the light emitting tube 206 is reflected in the positive direction along the Z-axis (predetermined direction) as an illuminating light. Also, the reflector 208 transmits the light in the infrared region from the light emitted from the light emitting tube 206 therethrough. In other words, the reflector 208 is the cold mirror which reflects the visible light but transmits the light in the infrared region.

The housing 210 constitutes an outer shell of the light source apparatus 203. The reflector 208 is attached to the housing 210. The housing 210 supports the reflector 208 and positions the reflector 208 in the interior of the light-source storage unit 250*a*.

The IR reflection mirror 212 is a member configured to reflect part of the light in the infrared region having transmitted through the reflector 208. The IR reflection mirror 212 is integrally formed with the housing 210 so as to extend in the direction opposite from the direction of emission of the illuminating light (the negative direction along the Z-axis). The IR reflection mirror 212 is formed to be positioned on an outlet port 214a side of an absorbing evaporator 214 with respect to the reflector 208 in a state in which the light source apparatus 203 is stored in the absorbing evaporator 214, described later (see also FIG. 13). The IR reflection mirror 212 is formed by metal deposited on a portion extending from the housing 210, and has a property to reflect the light in the infrared region. Specifically, by using gold as the metal to be deposited, the light in the infrared region may be efficiently reflected. Reflection of part of the light in the infrared region having transmitted through the reflector 208 in a desired direction is achieved by the IR reflection mirror 212. In the fourth embodiment, the light source apparatus 203 is applied to the projector 201, and the light in the infrared region is reflected toward the absorbing evaporator 214 by the IR reflection mirror 212.

The spatial light modulator 204 is a transmissive liquid crystal display apparatus configured to modulate the light emitted from the light emitting tube 206 according to the image signals. The light modulated by the spatial light modulator 204 is projected on the screen (not shown), and the video is displayed thereon. The temperature of the spatial light modulator 204 rises by being irradiated with the light emitted from the light-emitting tube 206. The heat generated in the spatial light modulator 204 is transferred through a heat transfer unit 226, described later, and is absorbed by the coolant in the interior of a low-temperature heat exchanger (evaporator) 224. Although there are three spatial light modulators 204 for the R-light, the G-light, and the B-light, only one of those is shown in the drawing for description.

The cooling system S3 roughly includes the absorbing evaporator (light source heat absorber) 214, a circulating pump 216, an ejector pump 218, a radiator (heat radiator) 220, a cooling fan 222, the low-temperature heat exchanger (evaporator) 224, and the heat transfer unit 226. The absorbing evaporator 214, the circulating pump 216, the ejector pump 218, the radiator 220, and the low-temperature heat exchanger 224 are connected via coolant tubes 228.

Figure 12:
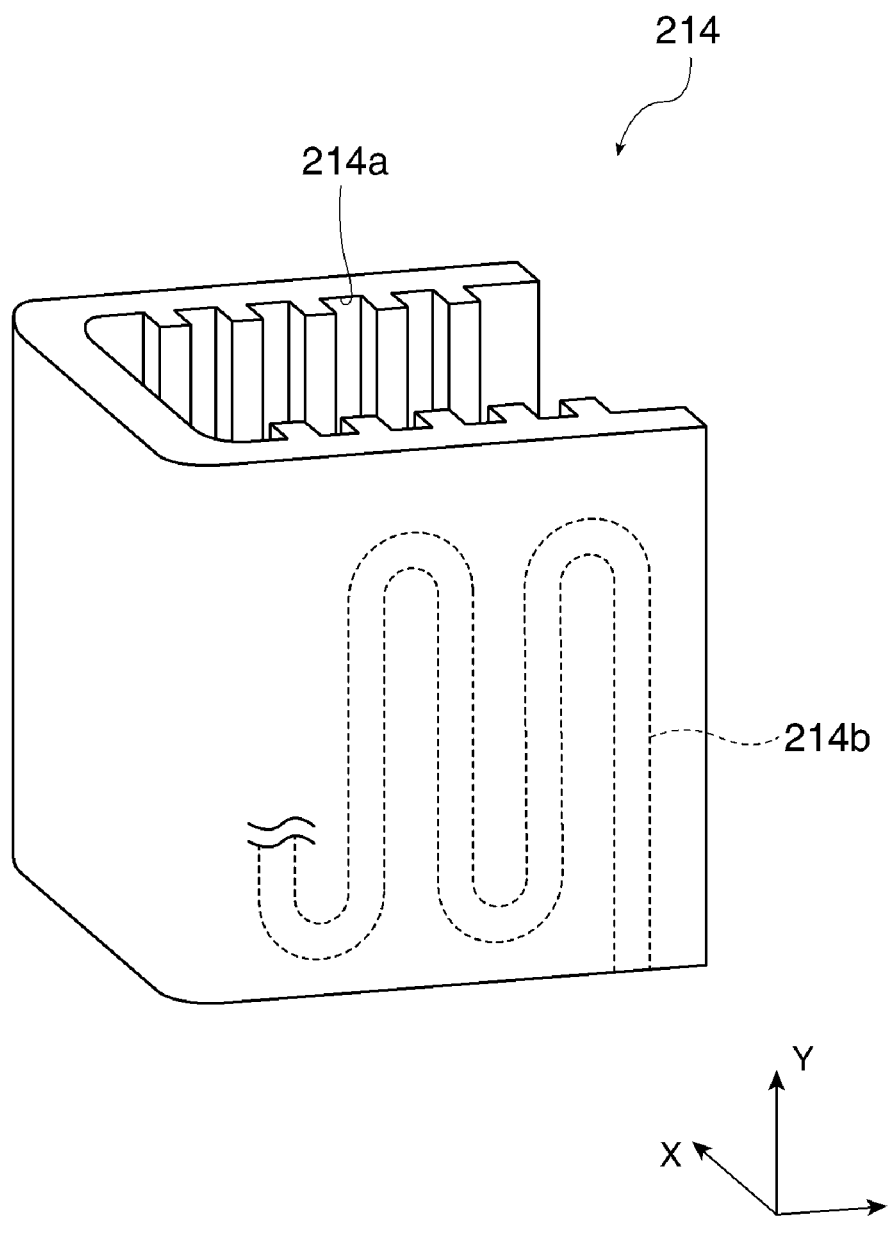
FIG. 12 is an appearance perspective view of the absorbing evaporator according to the fourth embodiment.
Figure 13:
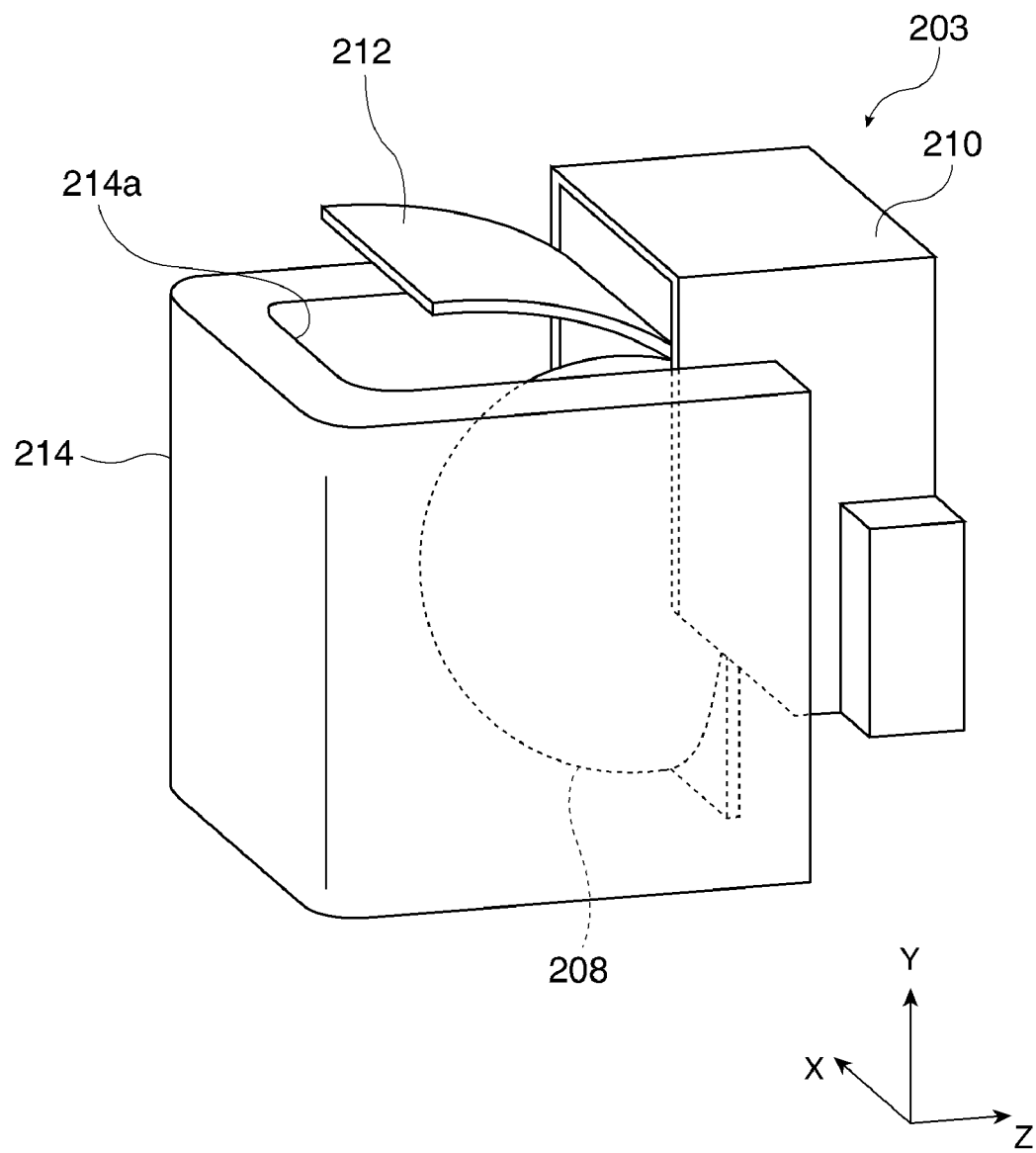
FIG. 13 is an appearance perspective view showing a state in which the light source apparatus is stored in the absorbing evaporator according to the fourth embodiment.

FIG. 12 is an appearance perspective view of the absorbing evaporator 214. FIG. 13 is an appearance perspective view showing a state in which the light source apparatus 203 is stored in the absorbing evaporator 214. The absorbing evaporator 214 is arranged in the light-source storage unit 250a (see also FIG. 10), and constitutes part of a wall surface of the light-source storage unit 250a. The absorbing evaporator 214 assumes a box shape which allows the light source apparatus 203 to be stored therein. The absorbing evaporator 214 assumes a state of being arranged in the periphery of the reflector 208 in a state in which the light source apparatus 203 is stored. The above-described lid member 250b also has a function to close the outlet port 214a of the absorbing evaporator 214.

The absorbing evaporator 214 has an opening on the surface on the side of the positive direction of the Z-axis, and allows the emission of the illuminating light from the light source apparatus 203. The absorbing evaporator 214 has an opening on the surface on the side of the positive direction of the Y-axis, and is the outlet port 214a which allows the light source apparatus 203 to be taken out therefrom. The absorbing evaporator 214 is formed of the metallic material with a high thermal conductivity, for example, of aluminum. The absorbing evaporator 214 is formed with a coolant flow channel 214b for allowing the coolant to pass therethrough in the interior thereof. An inner wall surface of the absorbing evaporator 214 on the reflector 208 side is formed with pits and projections. The inner wall surface of the absorbing evaporator 214 on the reflector 208 side is applied with the surface processing for enhancing the light absorption efficiency. For example, a surface processing which provides an emissivity of 0.8 or higher is applied, so that most part of the light in the infrared region irradiating the inner wall surface is absorbed.

Figure 14:
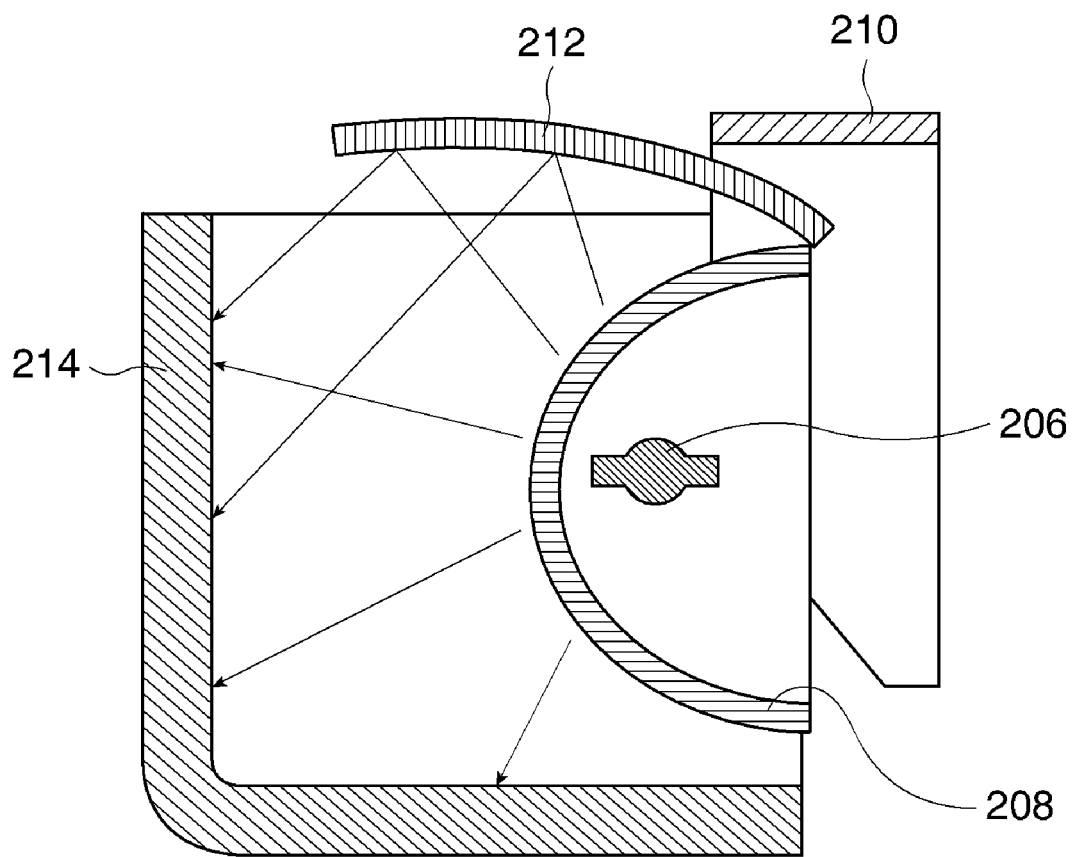
FIG. 14 is a lateral cross-sectional view showing a state in which the light source apparatus is stored in the absorbing evaporator according to the fourth embodiment.

FIG. 14 is a lateral cross-sectional view showing a state in which the light source apparatus 203 is stored in the absorbing evaporator 214. Most part of the light in the infrared region emitted from the light emitting tube 206 and transmitted through the reflector 208 directly irradiates the inner wall surface of the absorbing evaporator 214 to raise the temperature of the absorbing evaporator 214. The absorbing evaporator 214 causes the heat generated by the irradiation of the light in the infrared region to be absorbed by the coolant flowing in the coolant flow channel 214b. The coolant absorbs the heat in the course of flowing in the coolant flow channel 214b, is raised in temperature to a temperature higher than the boiling temperature, and evaporates.

The light in the infrared region proceeding to the outlet port 214a of the absorbing evaporator 214 from the light in the infrared region transmitted through the reflector 208 is reflected by the IR reflection mirror 212 and proceeds toward the inner wall surface of the absorbing evaporator 214. Accordingly, prevention of the light in the infrared region from leaking from the outlet port 214a is achieved. In other words, the light in the infrared region transmitted through the reflector 208 is focused to the absorbing evaporator 214, so that the heat generated by the light in the infrared region is caused to be efficiently absorbed by the absorbing evaporator 214. Since the inner wall surface of the absorbing evaporator 214 is formed with the pits and projections, the surface area thereof is increased. Accordingly, the heat absorption efficiency of the absorbing evaporator 214 is enhanced in comparison with the case in which the inner wall surface of the absorbing evaporator 214 is flat. In addition, since the surface processing for enhancing the light absorption efficiency is applied on the inner wall surface of the absorbing evaporator 214, heat absorption efficiency of the absorbing evaporator 214 is further enhanced.

The circulating pump 216 functions as a power source for circulating the coolant through the absorbing evaporator 214, the ejector pump 218, the radiator 220, and the low-temperature heat exchanger 224 connected to each other via the coolant tubes 228. As the coolant, for example, water, hydrofluoroether, fluorinated inactive liquid, propylene glycol, ethylene glycol or the like are used.

The ejector pump 218 assumes a double-nozzle shape in which a sub nozzle 218b surrounds the periphery of a main nozzle 218a coaxially. A wall surface of the main nozzle 218a is formed with a communication hole 218c which communicates the main nozzle 218a and the sub nozzle 218b. The absorbing evaporator 214 is connected to the main nozzle 218a of the ejector pump 218 via the coolant tube 228, and the coolant transformed into the gas phase by the absorbing evaporator 214 flows into the main nozzle 218a. The low-temperature heat exchanger 224 is connected to the sub nozzle 218b of the ejector pump 218 via the coolant tube 228.

When the coolant passes through the interior of the main nozzle 218a, the pressure in the sub nozzle 218b is decompressed via the communication hole 218c. Accordingly, the interior of the low-temperature heat exchanger 224 connected to the sub nozzle 218b is decompressed. In other words, the ejector pump 218 functions as a decompressor configured to decompress the interior of the low-temperature heat exchanger 224. The coolant is stored in the interior of the low-temperature heat exchanger 224 as described later in detail. The interior of the low-temperature heat exchanger 224 is decompressed by the ejector pump 218, and hence the boiling temperature of the coolant is lowered, and the coolant is easily evaporated. The gas-phase coolant is generated by the evaporation of the coolant in the interior of the low-temperature heat exchanger 224. The gas-phase coolant absorbs the vaporization heat from the liquid-phase coolant when evaporating. The gas-phase coolant generated in the low-temperature heat exchanger 224 is drawn into the main nozzle 218a via the sub nozzle 218b, joins the gas-phase coolant fed from the absorbing evaporator 214, and then is delivered to the radiator 220. The faster the velocity of the fluid passing in the interior of the main nozzle 218a of the ejector pump 218, the higher the decompression effect with respect to the sub nozzle 218b becomes. In the fourth embodiment, since the coolant passing through the main nozzle 218a is evaporated by the absorbing evaporator 214 and is transformed into the gas-phase coolant, it passes through the interior of the main nozzle 218a at a higher velocity than that of the liquid-phase coolant. Therefore, the decompression effect of the sub nozzle 218b is enhanced, so that the pressure in the interior of the low-temperature heat exchanger 224 may further be lowered. Accordingly, a temperature which is further lower than the evaporating temperature of the coolant in the interior of the low-temperature heat exchanger 224 is achieved.

The radiator 220 radiates heat that the coolant absorbs in the absorbing evaporator 214 and heat absorbed by the low-temperature heat exchanger 224 as the vaporization heat to the outside air. The flow channel (not shown) in which the coolant flows is formed in the interior of the radiator 220. The gas-phase coolant delivered from the ejector pump 218 is condensed by being cooled in the course of flowing in the flow channel in the radiator 220 and is transformed into the liquid-phase coolant. The coolant passed through the radiator 220 proceeds toward the absorbing evaporator 214 via the circulating pump 216. Since the liquid-phase coolant can hardly reduced in volume when being pumped in comparison with the gas-phase coolant, the circulating pump 216 configured to pump the liquid-phase coolant may be of the one smaller than the compressor or the like for pumping the gas-phase coolant.

The coolant tube 228 which connects the radiator 220 and the absorbing evaporator 214 is branched at a midsection thereof and is connected to the low-temperature heat exchanger 224. Therefore, part of the coolant flowed out from the radiator 220 proceeds toward the low-temperature heat exchanger 224 and is stored in the interior thereof. The cooling fan 222 enhances the cooling efficiency of the coolant by circulating air around the radiator 220.

The low-temperature heat exchanger 224 cools the coolant by evaporating the coolant stored in the interior thereof. The coolant is cooled by a loss of vaporization heat thereof at the time of evaporation within the low-temperature heat exchanger 224. The interior of the low-temperature heat exchanger 224 is decompressed by the ejector pump 218, and hence the boiling temperature of the coolant is lowered. Accordingly, the temperature of the coolant stored in the interior of the low-temperature heat exchanger 224 is cooled to a temperature around the boiling temperature. By decompressing the interior of the low-temperature heat exchanger 224 at which the boiling temperature of the coolant becomes not higher than the ambient temperature, cooling of the coolant in the interior of the low-temperature heat exchanger 224 to a temperature not higher than the ambient temperature is achieved. The coolant tube 228 connecting the radiator 220 and the low-temperature heat exchanger 224 is provided with a valve 213 configured to adjust the flow rate of the coolant.

By adjusting the flow rate of the coolant proceeding toward the low-temperature heat exchanger 224 by the valve 213, the liquid-phase coolant in the interior of the low-temperature heat exchanger 224 may be prevented from being drawn into the ejector pump 218.

The heat transfer unit 226 is formed of a material with a high thermal conductivity, for example, the metallic material such as aluminum or copper. The heat transfer unit 226 is provided in a state of being in contact with both the spatial light modulator 204 and the liquid-phase coolant in the interior of the low-temperature heat exchanger 224. The heat generated in the spatial light modulator 204 is transferred through the heat transfer unit 226 and is absorbed by the coolant in the interior of the low-temperature heat exchanger 224, and the spatial light modulator 204 is cooled. Accordingly, deterioration of the spatial light modulator 204 due to the temperature rise is prevented, so that elongation of the lifetime of the projector 201 is achieved. It is also possible to improve the cooling efficiency by employing a fin structure at a portion of the heat transfer unit 226 coming into contact with the coolant in the interior of the low-temperature heat exchanger 224.

Figure 15:
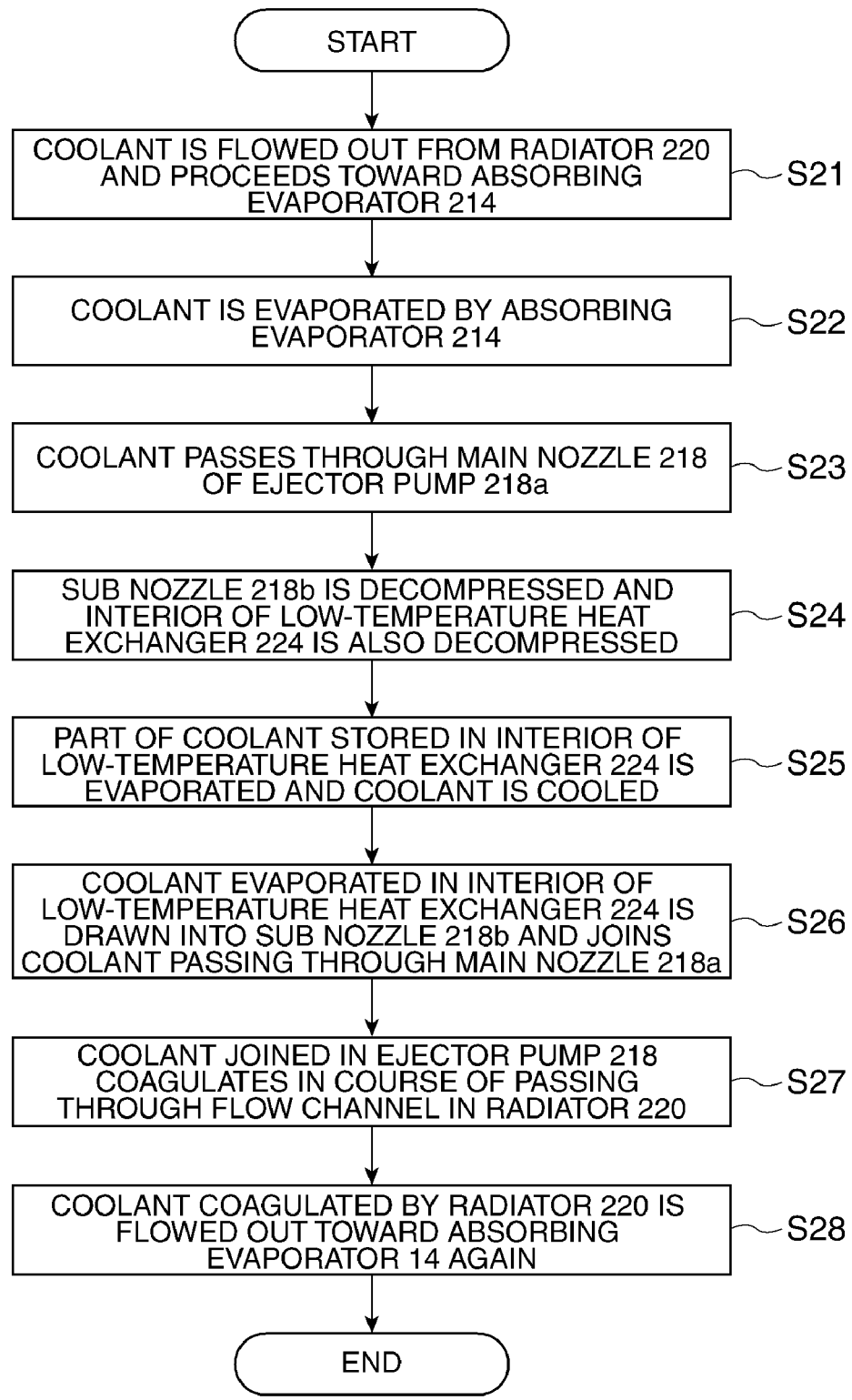
FIG. 15 is a flowchart for explaining a flow of circulation of the coolant in a cooling system according to the fourth embodiment.

Referring now to a flowchart in FIG. 15, a flow of the circulation of the coolant in the cooling system S3 well be described.

The coolant is flowed out from the radiator 220 and proceeds toward the absorbing evaporator 214 (Step S21). The coolant flowed out from the radiator 220 is evaporated by the absorbing evaporator 214 (Step S22). When the coolant transformed into the gas phase by being evaporated by the absorbing evaporator 214 passes though the main nozzle 218a of the ejector pump 218 (Step S23), the interior of the sub nozzle 218b is decompressed, whereby the interior of the low-temperature heat exchanger 224 is also decompressed (Step S24). Part of the coolant flowed from the radiator 220 is stored in the interior of the low-temperature heat exchanger 224, and the stored part of the coolant is evaporated by the decompression in the interior of the low-temperature heat exchanger 224, so that the coolant is cooled (Step S25). The coolant transformed into the gas phase by being evaporated in the interior of the low-temperature heat exchanger 224 is drawn into the sub nozzle 218b, and joins the coolant passing through the main nozzle 218a (Step S26). The coolant joined in the ejector pump 218 is flowed into the radiator 220, and coagulates due to a loss of heat by being absorbed by the outside air in the course of passing through the flow channel in the radiator 220 (Step S27). The coolant coagulated in the radiator 220 flows out toward the absorbing evaporator 214 again (Step S28).

As described above, since the projector 201 according to the fourth embodiment includes the outlet port 214a on the absorbing evaporator 214 which stores the light source apparatus 203, taking out of the light source apparatus 203 from the projector 201 is easily achieved. Therefore, replacement of the light source apparatus 203 is easily achieved when the lifetime of the light source apparatus 203 is ended. Also, since the light in the infrared region passing through the reflector 208 proceeding took the outlet port 214a is reflected by the IR reflection mirror 212 toward the absorbing evaporator 214, the light in the infrared region may be prevented from leaking from the outlet port 214a. Therefore, the heat generated by the light in the infrared region passed through the reflector 208 may be efficiently absorbed by the absorbing evaporator.

Since the IR reflection mirror 212 is formed integrally with the housing 210 and is formed integrally with the light source apparatus 203, the IR mirror 212 is taken out together when the light source apparatus 203 is taken out, the IR mirror 212 does not hinder the operation to take out the light source apparatus 203. Therefore, replacement of the light source apparatus 203 is achieved further easily.

Since the IR mirror 212 is formed integrally with the housing 210, the IR mirror 212 may be formed of the same material as the housing 210, so that the reduction of the manufacturing cost is achieved. Also, since the metal is deposited on the surface, even when the material of the housing 210 does not have a property to reflect the light in the infrared region by itself, the property to reflect the light in the infrared region may be imparted to the IR mirror 212.

Since the spatial light modulator 204 is cooled by causing the coolant cooled in the low-temperature heat exchanger 224 to absorb the heat generated in the spatial light modulator 204, deterioration of the spatial light modulator 204 is prevented so that elongation of the lifetime of the projector 201 as the product is achieved. Also, since the coolant is evaporated using the heat of the light-emitting tube 206 at a very high temperature and the coolant transformed into the gas phase by the evaporation is caused to pass though the ejector pump 218, the interior of the low-temperature heat exchanger 224 is sufficiently decompressed. Since the interior of the low-temperature heat exchanger 224 is sufficiently decompressed, lowering the evaporating temperature of the coolant stored in the interior thereof is achieved. When the evaporating temperature of the coolant is lowered, sufficient cooling of the coolant in the interior of the low-temperature heat exchanger 224 is achieved in the environment of about the ambient temperature, so that the temperature of the coolant may be lowered to a temperature lower than the room temperature. Since the spatial light modulator 204 is cooled by the coolant sufficiently cooled, the cooling effect is enhanced. Since the spatial light modulator 204 is cooled by causing the coolant cooled by the low-temperature heat exchanger 224 to absorb the heat, the reduction of the number of components is achieved. Also, even when the fan configured to cool the spatial light modulator 204 is provided, since the cooling of the spatial light modulator 204 is achieved with the small airflow quantity, the improvement of the quietness of the projector 201 is achieved by reducing the driving noise of the fan.

The vapor passed through the main nozzle 218a of the ejector pump 218 configured to decompress the interior of the low-temperature heat exchanger 224 is generated by a thermal energy generated by the light-emitting tube 206, which is thrown away in the related art, the reduction of the power consumption is achieved in comparison with the case of using the cooling apparatus provided with the compressor.

Also the downsizing of the ejector pump 218, being easier than that of the compressor, contributes also to downsizing of the cooling system S3, and hence of the projector 201.

A configuration in which the air having absorbed the heat of the coolant by the radiator 220 and being flowed by the cooling fan 222 is blown onto the light emitting tube 206 is also applicable. For example, a configuration in which the duct (air passage) is provided, and the air flowed by the cooling fan 222 is blown onto the light emitting tube 206 is also applicable. Since the temperature of the light-emitting tube 206 becomes very high, the temperature difference of the air and the light-emitting tube 206 is large even though the air is raised in temperature by absorbing the heat of the coolant in the radiator 220, and hence cooling of the light-emitting tube 206 is achieved with sufficient cooling efficiency. Also, since cooling of the radiator 220 and cooling of light-emitting tube 206 are achieved with the single cooling fan 222, this configuration contributes to downsizing, reduction of the number of components, and reduction of the manufacturing cost of the projector 201 in comparison with the case of providing the fans for cooling the radiator 220 and the light-emitting tube 206, respectively. Also, improvement of the quietness is achieved in comparison with a case of providing a plurality of the fans. In addition, a configuration in which the cooling fan 222 is configured to serve simultaneously as other fans arranged in the projector in the related art such as a fan for cooling the power source or a fan for exhausting air in the projector casing.

Also, the capillary tube may be provided instead of the valve 213. The capillary tube is configured into a capillary in the interior thereof, and allows passage of the coolant of an amount corresponding to the pressure difference of the coolant between the inlet side and the outlet side of the capillary tube. Therefore, an adequate amount of coolant is allowed to flow into the low-temperature heat exchanger 224 without providing the valve 213 for adjusting the flow rate of the coolant between the radiator 220 and the low-temperature heat exchanger 224. Since the valve 213 is not necessary, this configuration contributes to the reduction of the number of components and the downsizing of the projector 201.

The device for causing the heat generated in the spatial light modulator 204 to be absorbed by the coolant within the low-temperature heat exchanger 224 is not limited to the case using the heat transfer unit 226. For example, it is also possible to cause a coolant in a separate system from the coolant in the low-temperature heat exchanger 224 to absorb the heat generated by the spatial light modulator 204 and pass the coolant in the separate system through the piping disposed in the low-temperature heat exchanger 224 to cause the coolant in the low-temperature heat exchanger to absorb the heat generated by the spatial light modulator 204. The spatial light modulator and the low-temperature heat exchanger may be brought into direct contact with each other.

The projector 201 is not limited to a configuration having the spatial light modulators 204 for the respective colors. The projector 201 may have a configuration to modulate two, three or more of colored lights by the single spatial light modulator 204. The projector 201 may be so-called a rear projector which is configured to supply light to one surface of the screen, and emit the light from the other surface of the screen for allowing the viewers to appreciate the image.

Figure 16:
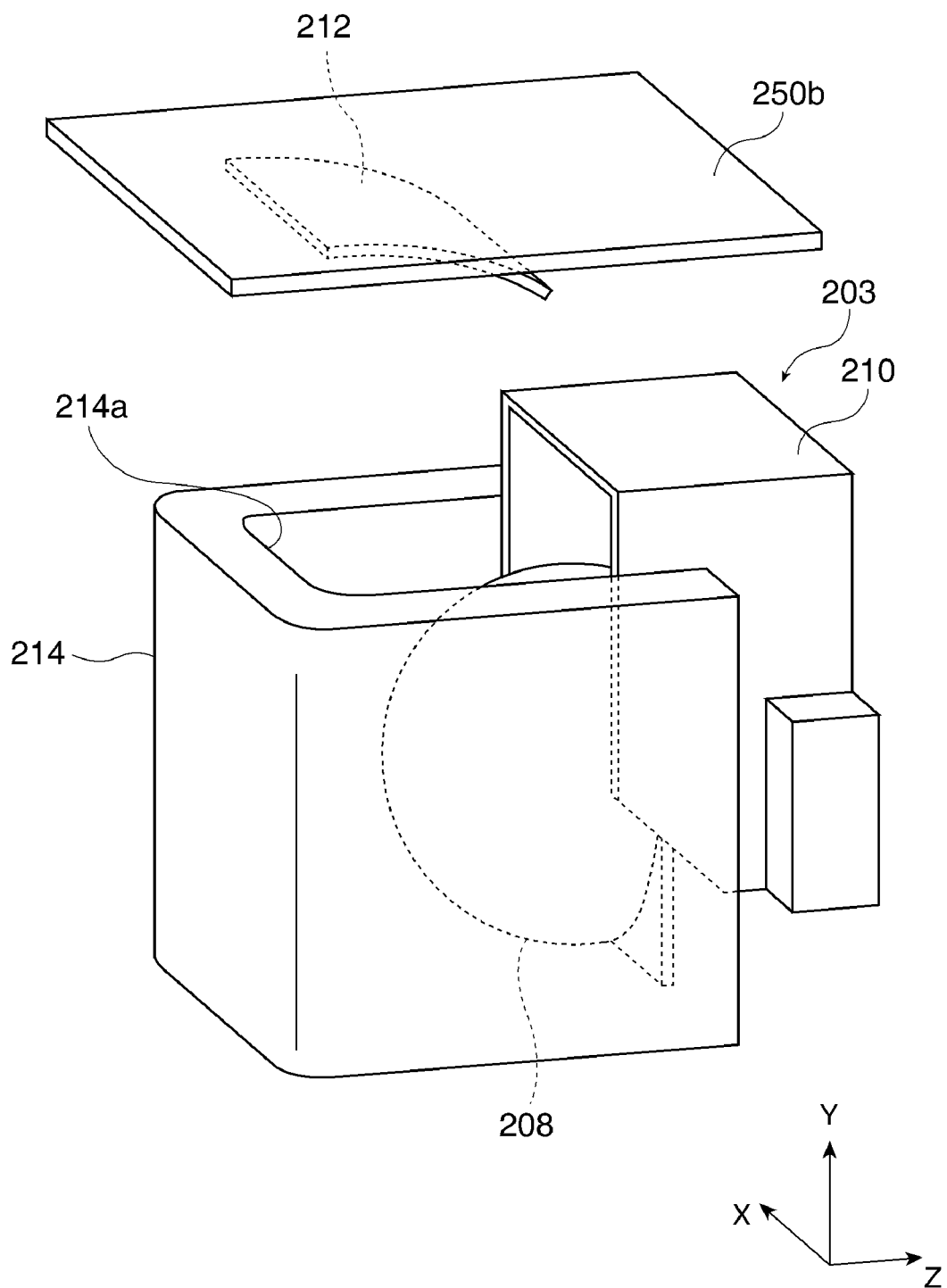
FIG. 16 is a drawing for explaining the position to mount an IR mirror according to a first modification of the fourth embodiment.

FIG. 16 is a drawing for explaining the position to mount the IR mirror according to a first modification of the fourth embodiment. The like elements are designated by the same numbers as in the configurations described above and overlapped description will be omitted.

In the first modification, the IR mirror 212 is mounted on the lid member 250b, and the IR mirror 212 and the lid member 250b are integrally formed. Since the IR mirror 212 is provided integrally with the lid member 250b which is configured to close the outlet port 214a, the IR reflection mirror 212 is also removed together by removing the lid member 250b when taking out the light source apparatus 203. Therefore, the state of the light source apparatus 203 stored in the absorbing evaporator 214 may be confirmed without being hindered by the IR reflection mirror 212 only by removing the lid member 250b. Since the IR mirror 212 is provided separately from the light source apparatus 203, the reduction of the cost of the light source apparatus 203 by itself is achieved. Accordingly, reduction of the cost for replacing the light source apparatus 203 is achieved.

In the respective embodiments, the transmissive liquid crystal display apparatus is used as the spatial light modulator. However, the invention is not limited thereto. As the spatial light modulator, a reflective liquid crystal display apparatus (Liquid Crystal on Silicon; LCOS), DMD (Digital Micromirror Device), or GLV (Grating Light Valve) may be employed. When the reflective liquid crystal display apparatus is used as the spatial light modulator, a configuration in which the heat transfer unit is brought into contact with the back side of the reflecting surface of the reflective liquid crystal display apparatus to discharge heat generated in the reflective liquid crystal display apparatus is also applicable. Although the coolant cooled by the low-temperature heat exchanger is intended to cool the spatial light modulator, it may be intended to cool other heat sources provided in the projector, for example, a polarizing plate and an electric circuit.

In the respective embodiments, the coolant evaporated by the absorbing evaporator as the light source heat absorber is used in the main nozzle of the ejector pump. However, the invention is limited thereto. Decompression in the sub nozzle is also achieved by allowing passage of the coolant through the main nozzle of the ejector pump in the state of the liquid phase without evaporating the coolant by the light source heat absorber.

The projectors in the respective embodiments are not limited to a configuration in which the spatial light modulators are provided for the respective colors, but a configuration in which two, three or more of the colored lights are modulated by the single spatial light modulator is also applicable. The projector may be so-called the rear projector which is configured to supply light to one surface of the screen, and emit the light from the other surface of the screen for allowing the viewers to appreciate the image.

The entire disclosure of Japanese Patent Application Nos. 2008-212516, filed Aug. 21, 2008 and 2008-252672, filed Sep. 30, 2008 are expressly incorporated by reference herein.

What is claimed is:

1. A projector configured to display an image comprising:
a light source unit configured to emit light for displaying the image;
a light source heat absorber configured to cause coolant to absorb heat from the light source unit;
an ejector pump configured to allow passage of the coolant having absorbed the heat in the light source heat absorber;
a radiator configured to radiate the heat of the coolant flowed out from the ejector pump;
an evaporator configured to cool the coolant stored in the evaporator by evaporating the coolant; and
a heat source other than the light source unit, wherein the ejector pump decompress the interior of the evaporator by a pressure drop due to the passage of the coolant having absorbed the heat in the light source heat absorber, and
heat from the heat sources other than the light source unit is absorbed by the coolant cooled by the evaporator.

2. The projector according to claim 1,
wherein the coolant is evaporated in the light source heat absorber.

3. The projector according to claim 1,
wherein the heat source is an optical element configured to modulate light emitted from the light source unit.

4. The projector according to claim 3, further comprising a heat pipe surrounding the periphery of the optical element,
wherein part of the heat pipe is fixed to the evaporator for achieving heat exchange.

5. The projector according to claim 3,
wherein the optical element is arranged in contact with the evaporator.

6. The projector according to claim 3, further comprising:
an optical element heat absorber configured to cause coolant flowing separately from the coolant in the interior of the evaporator to absorb heat from the optical element; and
a piping disposed in the interior of the evaporator for allowing passage of the coolant having absorbed the heat in the optical element heat absorber.

7. The projector according to claim 6, wherein the optical element heat absorber and the piping are connected by a flexible tube.

8. The projector according to claim 6,
wherein the optical element heat absorber includes the heat pipe surrounding the periphery of the optical element, and
part of the heat pipe is cooled by the coolant flowing separately from the coolant in the interior of the evaporator.

9. The projector according to claim 1,
wherein the light source heat absorber includes: a reflector having a first surface for reflecting light in a visible region and transmitting light in an infrared region and a second surface formed on the opposite side of the first surface, and
the second surface is provided with a surface processing which enhances light absorption efficiency.

10. The projector according to claim 1, further comprising:
a cooling fan configured to feed air from the radiator toward the light source unit to cool the radiator and the light source unit.

11. The projector according to claim 1,
wherein the light source apparatus as the light source unit includes:
a light-emitting unit configured to emit light, and
a first reflector configured to reflect illuminating light emitted from the light-emitting unit into a predetermined direction and transmit the light in the infrared region emitted from the light-emitting unit, and
the light source heat absorber includes: an outlet port being arranged in the periphery of the first reflector to store the light source apparatus therein and allowing the light source apparatus to be taken out in a direction different from the predetermined direction, and absorbs the heat from the light source apparatus, and
further includes a second reflector configured to reflect the light in the infrared region transmitting through the first reflector and proceeding to the outlet port toward the light source heat absorber.

12. The projector according to claim 11, wherein the coolant is evaporated in the light source heat absorber.

13. The projector according to claim 11, wherein the heat source is the optical element configured to modulate the light emitted from the light-emitting unit.

14. A projector configured to display an image comprising:
a light source apparatus configured to emit light for displaying the image having:
a light-emitting unit configured to emit light and
a first reflector configured to reflect illuminating light emitted from the light-emitting unfit to a predetermined direction and transmit light in the infrared region emitted from the light-emitting unit; and
a light source heat absorber which is arranged in the periphery of the first reflector to store the light source apparatus therein, is formed with an outlet port which allows the light source apparatus to be taken out in a direction different from the predetermined direction, and is configured to absorb the heat from the light source apparatus; and a second reflector configured to reflect the light in the infrared region transmitting through the first reflector and proceeding to the outlet port toward the light source heat absorber.

15. The projector according to claim 14,
wherein the second reflector is provided integrally with the light source apparatus.

16. The projector according to claim 15,
wherein the second reflector is integrally formed with a housing which constitutes a shell of the light source apparatus and is deposited with metal on a surface thereof.

17. The projector according to claim 14,
wherein a lid member configured to close the outlet port is further provided, and the second reflector is provided integrally with the lid member.

18. The projector according to claim 14,
wherein at least part of an inner wall surface of the light source heat absorber on the side of the first reflector is formed with pits and projections.

19. A light source apparatus comprising:
a light-emitting unit configured to emit light;
a first reflector configured to reflect illuminating light emitted from the light-emitting unit to a predetermined direction and transmit light in an infrared region emitted from the light-emitting unit, and
a second reflector configured to reflect the light in the infrared region having transmitted through the first reflector.

20. The light source apparatus according to claim 19,
wherein the light source apparatus is used by being stored in a light source heat absorber provided in the projector for absorbing heat from the light source apparatus, and
the second reflector reflects the light in the infrared region toward the light source heat absorber.

\* \* \* \* \*